(12) United States Patent
Truthseeker et al.

(10) Patent No.: US 10,361,653 B2
(45) Date of Patent: Jul. 23, 2019

(54) SOLAR MODULE WITH INTEGRATED MOUNTING COMPONENTS FOR MOUNTING ON A SURFACE

(71) Applicants: Samuel Marcus-Flack Truthseeker, El Sobrante, CA (US); Daniel William Carey, Pacifica, CA (US)

(72) Inventors: Samuel Marcus-Flack Truthseeker, El Sobrante, CA (US); Daniel William Carey, Pacifica, CA (US)

(73) Assignee: TESCI Solar, Inc., El Sobrante, CA (US)

( * ) Notice: Subject to any disclaimer, the term of this patent is extended or adjusted under 35 U.S.C. 154(b) by 37 days.

(21) Appl. No.: 15/470,676

(22) Filed: Mar. 27, 2017

(65) Prior Publication Data

US 2017/0279404 A1    Sep. 28, 2017

Related U.S. Application Data

(60) Provisional application No. 62/313,414, filed on Mar. 25, 2016.

(51) Int. Cl.
| | |
|---|---|
| *H02S 20/23* | (2014.01) |
| *F24S 20/67* | (2018.01) |
| *F24S 25/61* | (2018.01) |
| *H02S 20/00* | (2014.01) |
| *F24S 25/70* | (2018.01) |

(Continued)

(52) U.S. Cl.
CPC .............. *H02S 20/23* (2014.12); *F24S 20/67* (2018.05); *F24S 25/61* (2018.05); *F24S 25/634* (2018.05); *F24S 25/70* (2018.05); *H02S 20/00* (2013.01); *F24S 25/60* (2018.05); *F24S 2025/014* (2018.05); *F24S 2025/6005* (2018.05); *F24S 2025/6006* (2018.05); *Y02B 10/12* (2013.01);

(Continued)

(58) Field of Classification Search
CPC .......... H02S 20/23; H02S 20/00; F24S 25/70; F24S 25/634; F24S 25/61
USPC ........................................................ 136/244
See application file for complete search history.

(56) References Cited

U.S. PATENT DOCUMENTS

| | | | | |
|---|---|---|---|---|
| 9,166,522 | B1 * | 10/2015 | Zvanut | H02S 20/23 |
| 2009/0056792 | A1 * | 3/2009 | Salyer | H02S 20/00 |
| | | | | 136/251 |

(Continued)

FOREIGN PATENT DOCUMENTS

| | | |
|---|---|---|
| WO | 2009150466 A2 | 12/2009 |
| WO | 2011046578 A1 | 4/2011 |

OTHER PUBLICATIONS

International Search Report and Written Opinion issued by the International Searching Authority regarding PCT/US2017/024196 dated Sep. 25, 2017; pp. 1-16.

*Primary Examiner* — Jayne L Mershon
(74) *Attorney, Agent, or Firm* — Armstrong Teasdale LLP

(57) ABSTRACT

A solar module for installation on a structure includes a laminate for converting solar energy into electricity. The solar module also includes a mount releasably connected to the laminate for mounting the solar module on a surface of the structure. The mount includes openings to receive fasteners for securing the mount to the surface of the structure. The solar module has a pre-mount configuration in which the mount is connected to the laminate as a single unit. The mount is sized to allow the solar module to be shipped in the pre-mount configuration.

33 Claims, 19 Drawing Sheets

(51) Int. Cl.
*F24S 25/634* (2018.01)
*F24S 25/60* (2018.01)
*F24S 25/00* (2018.01)

(52) U.S. Cl.
CPC .............. *Y02B 10/20* (2013.01); *Y02E 10/47* (2013.01); *Y02E 10/50* (2013.01)

(56) References Cited

U.S. PATENT DOCUMENTS

| | | |
|---|---|---|
| 2012/0061337 A1 | 3/2012 | Seery et al. |
| 2012/0325306 A1* | 12/2012 | Auman .................. B32B 27/08 136/256 |
| 2013/0000689 A1* | 1/2013 | Balyon .................. F24S 25/33 136/244 |
| 2013/0140416 A1 | 6/2013 | West et al. |
| 2014/0061396 A1 | 3/2014 | Magno, Jr. et al. |
| 2014/0103591 A1* | 4/2014 | Petit ....................... B62D 65/18 269/55 |
| 2014/0230877 A1 | 8/2014 | Goldberg et al. |
| 2016/0043692 A1* | 2/2016 | Oikawa ................ H01L 31/048 136/251 |
| 2017/0149166 A1* | 5/2017 | Mann ................ H01R 13/5202 |

\* cited by examiner

SOLAR MODULE WITH INTEGRATED MOUNTING COMPONENTS FOR MOUNTING ON A SURFACE

CROSS REFERENCE TO RELATED APPLICATIONS

This application claims priority to U.S. Provisional Application No. 62/313,414, filed Mar. 25, 2016, which is hereby incorporated by reference in its entirety.

FIELD

This disclosure generally relates to solar modules and, more specifically, to a preassembled solar module for mounting on a surface.

BACKGROUND

Solar modules are devices that convert solar energy into other forms of useful energy (e.g., electricity or thermal energy). Such modules are typically positioned above an underlying structure surface by a rack. In addition, the solar modules are required to be positioned in a precise layout on the structure surface and secured to the structure surface. For example, at least some known solar modules and racks are installed using components such as flashing, L-Feet, lag bolts, rails, clamps, stanchions, grounding lugs, splices, and skirts.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a solar module for installation on a structure includes a laminate for converting solar energy into electricity. The solar module also includes a mount releasably connected to the laminate for mounting the solar module on a surface of the structure. The mount includes openings to receive fasteners for securing the mount to the surface of the structure. The solar module has a pre-mount configuration in which the mount is connected to the laminate as a single unit. The mount is sized to allow the solar module to be shipped in the pre-mount configuration.

In another aspect, a solar module for mounting on a surface of a structure includes a laminate and a mount for mounting the solar module on the surface of the structure, the mount connected to the laminate. The solar module also includes fasteners for securing the mount to the surface of the structure. Each mount has a pre-mount configuration in which the fasteners are retained in openings in the mount and the mount is positionable relative to the surface of the structure.

In still another aspect, a solar module for mounting on a surface of a structure includes a laminate and a mount for mounting the solar module on the surface of the structure. The mount is connected to the laminate. The solar module also includes a leveling mechanism for leveling the laminate when the solar module is mounted on the surface. The leveling mechanism is adjustable to adjust the position of the laminate in relation to the mount.

In another aspect, a solar module includes a laminate and a mount connected to the laminate for mounting the solar module on a surface of a structure. The mount includes a base defining a mounting surface facing the surface of the structure. The mount also includes a flashing material attached to the base so as to be disposed between the mounting surface and the structure surface. The mount further includes a plurality of raised interfaces extending from the base and defining openings for receiving fasteners for securing the mount to the structure surface. The raised interfaces are configured to retain the fasteners in the openings prior to the mount being secured to the structure surface.

In another aspect, a solar module for mounting on a surface of a structure includes a laminate having a substantially rectangular shape and a mount for mounting the solar module on the surface of the structure. The mount is connected to the laminate along a perimeter of the laminate. The mount includes openings for receiving fasteners to mount the solar module to the surface of the structure. The openings are arranged in an asymmetric pattern in the mount.

In another aspect, a solar array includes a first solar module including a first mount for mounting the first solar module on a surface of a structure. The solar array also includes a second solar module including a second mount for mounting the second solar module on the surface of the structure. The second mount engages the first mount to secure the first solar module to the surface of the structure. The second solar module is positioned adjacent the first solar module and offset from the first solar module when the first solar module and the second solar module are mounted to the surface of the structure.

In another aspect, a method of retrofitting a damaged solar laminate with an undamaged solar laminate in a mount previously positioned on a structure includes releasing a release on the damaged solar laminate. The method also includes removing the damaged solar laminate and placing an undamaged solar laminate into the mount. The method further includes securing the undamaged solar laminate to the mount.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Figure 1A:
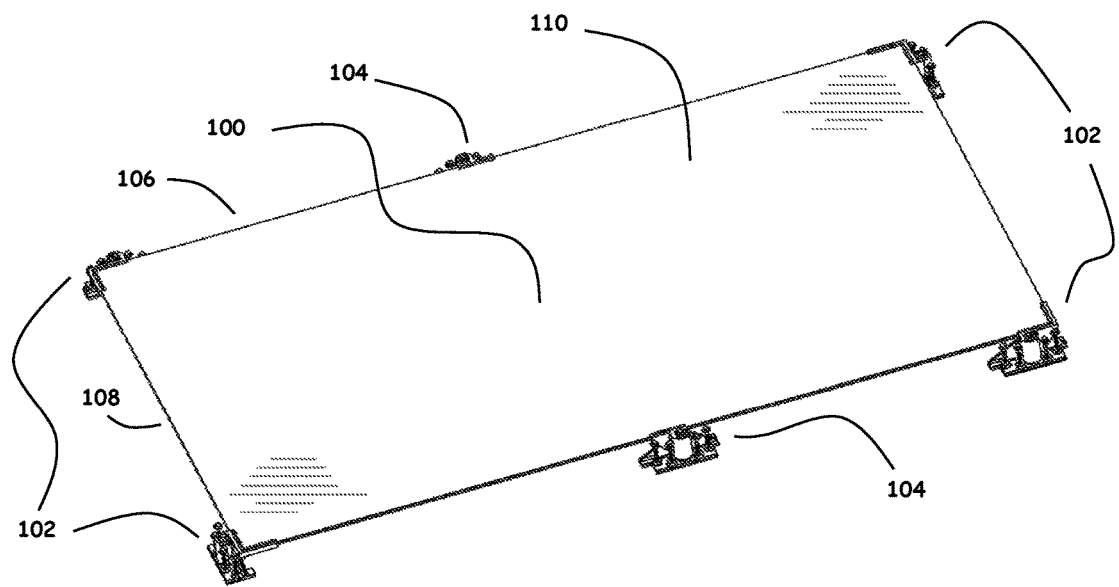
FIG. 1A is a perspective view of a solar module.
Figure 1B:
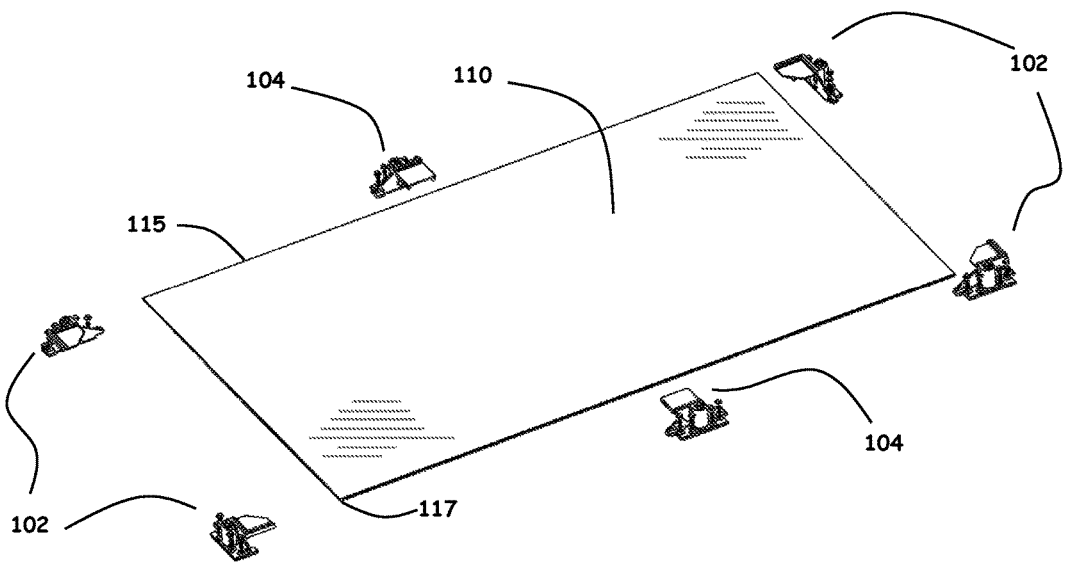
FIG. 1B is an exploded view of the solar module shown in FIG. 1A.
Figure 2A:
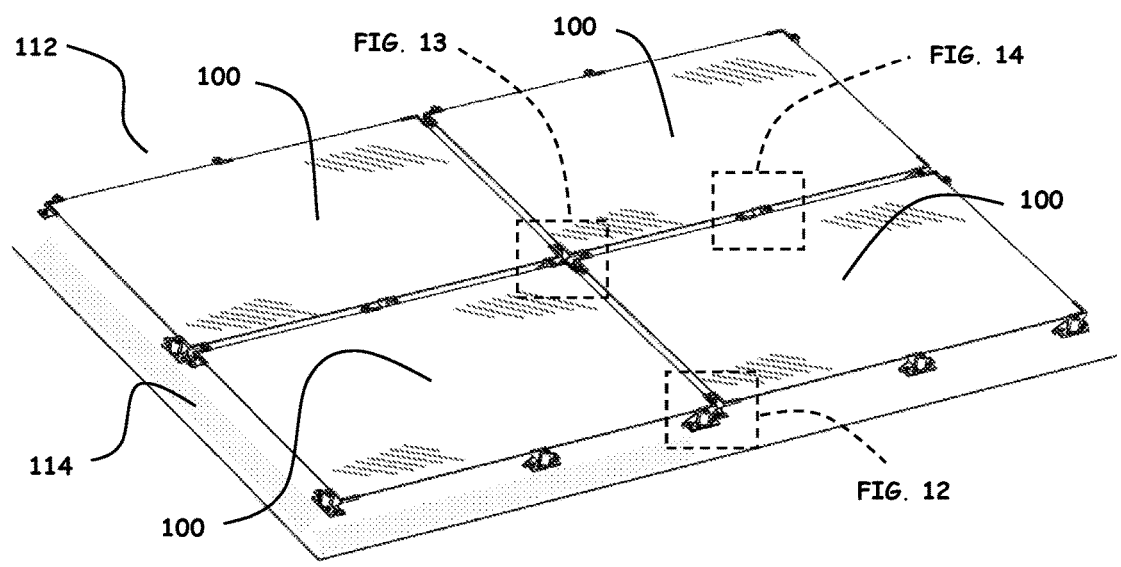
FIG. 2A is a perspective view of a solar array mounted on a surface of a structure.

Referring initially to FIG. 2A, a solar array 112 of one embodiment includes solar modules 100 mounted on a surface 114 of a structure. The structure may be, for example, a building having a sloped roof or any other structure suitable for mounting solar modules. FIG. 1A is a perspective view of one solar module 100 of the solar array 112. FIG. 1B is an exploded view of the solar module 100. The solar module 100 includes a solar laminate 110 and mounting structures or feet 102, 104 supporting the solar laminate. In some embodiments, the feet 102, 104 attach the solar module 100 to the surface 114 of the structure.

In one embodiment, the solar laminate 110 includes a top surface, a bottom surface, and edges 115 extending between the top surface and the bottom surface. The edges 115 meet at corners 117. The solar laminate 110 has a width 108 and a length 106. In this embodiment, the solar laminate 110 is rectangular shaped. In other embodiments, the solar laminate 110 may have any suitable shape.

The solar laminate 110 also has a laminate structure that may include several layers. The layers may include, for example, glass layers, non-reflective layers, electrical connection layers, n-type silicon layers, p-type silicon layers, and/or backing layers. One or more layers may also include solar cells (not shown). In other embodiments, the solar laminate may have more or fewer, including one, layers, may have different layers, and/or may have different types of layers.

In one embodiment, for example, the solar laminate 110 includes photovoltaic material such as solar cells, and electrical interconnect conductors. The solar cells and electrical interconnect conductors may be positioned between materials including glass sheets, adhesives such as ethylene-vinyl acetate, and protectant films such as polyvinyl fluoride film. The laminate may also include external electrical terminals, wiring pigtails, and connectors to enable the module to be electrically connected to other modules and to power conversion devices. The laminate may also include electrical power conversion devices, such as micro-inverters or DC power maximizers, which may be attached to or embedded in the laminate.

As shown in FIG. 1A, the solar module 100 is frameless. In other words, the edges 115 of the solar module 100 are free of fully enclosing structures and have only discrete mounting structures or mounts, e.g., feet 102, 104, attached to the laminate 110. Being frameless has multiple advantages such as: i) reducing the weight and cost of the solar module 100; ii) increasing unobstructed surface area available for solar collection; iii) allowing water, snow, and other contaminants to be more easily shed from the module surface without a frame to obstruct flow at the edges. As a result, the frameless solar module 100 has increased energy generation in comparison to at least some solar modules including fully enclosing frames. In alternative embodiments, the solar module 100 may include any frame components that enable the solar module to function as described.

In this embodiment, the discrete mounting structures or mounts, e.g., feet 102, 104, attached to the laminate are electrically insulating. For example, the mounting structures may be built from plastic or polymer materials. The non-conductive mounting structures may eliminate the requirement for module and array ground bonding. Accordingly, the electrically insulating mounting structures have at least two key benefits, which are: i) reduction in electrical potential gradients on the module which can give rise to potential induced performance degradation (PID); ii) reduction in labor and materials required to ground the solar array. In alternative embodiments, the solar modules may include some electrically conductive support components and/or module frames.

In reference to FIGS. 1A-3, the solar laminate 110 is supported by multiple feet, or broadly mounts, 102, 104 which are mounted to the surface 114. The feet 102, 104 are positioned to sustain and distribute the load of the solar laminate 110. The load is due to the weight of the laminate and other up-forces and down-forces. For example, loads may be induced by temperature, wind, precipitation, and snow. Accordingly, the feet 102, 104 provide load distribution points which increase the loading capacity of the solar modules 100. In suitable embodiments, the solar modules 100 may include any number of feet 102, 104 distributed around the module periphery, or on the rear surface of the laminate, that enable the solar module to function as described. For example, in some embodiments, each solar module 100 may include four feet 102, 104, positioned either at the corners 117 or on the edges 115 of the laminate 110. In the illustrated embodiment, each solar module 100 includes at least six feet 102, 104. In particular, each solar module 100 includes feet 102, 104 at the corners 117 and on the sides mid-span. The side feet 104 further strengthen the module and better distribute the various loads. In further embodiments, the solar modules 100 may include eight or more feet 102, 104. The number of feet 102, 104 may be determined based on the size of the modules 100, the loads to be handled, and the strength and uniformity of the support structure surface 114. Feet 102, 104 attached to the rear surface of the laminate 110 may be used to increase the modules 100 resistance to snow load. In some embodiments, at least one of the solar modules 100 may include a number of feet 102, 104 that is different from the number of feet of a different solar module.

In this embodiment, the feet 102, 104 include corner feet 102 and side feet 104. A corner foot 102 is positioned at each of the corners 117 of the solar laminate 110. The side feet 104 are positioned along the edges 115 of the solar laminate 110. Specifically, the edge feet 104 are along the longest edges 115 midway between the corners. The corner feet 102 and the edge feet 104 protect the corners and edges of the solar laminates 110 during shipping and installation. In alternative embodiments, the solar module 100 may include any feet 102, 104 that enable the solar array 112 to operate as described. Additionally, each foot 102, 104 may be the same as or different from one or more other feet on the solar module 100. For example, in some embodiments, the solar module 100 includes four different corner feet 104.

Figure 2B:
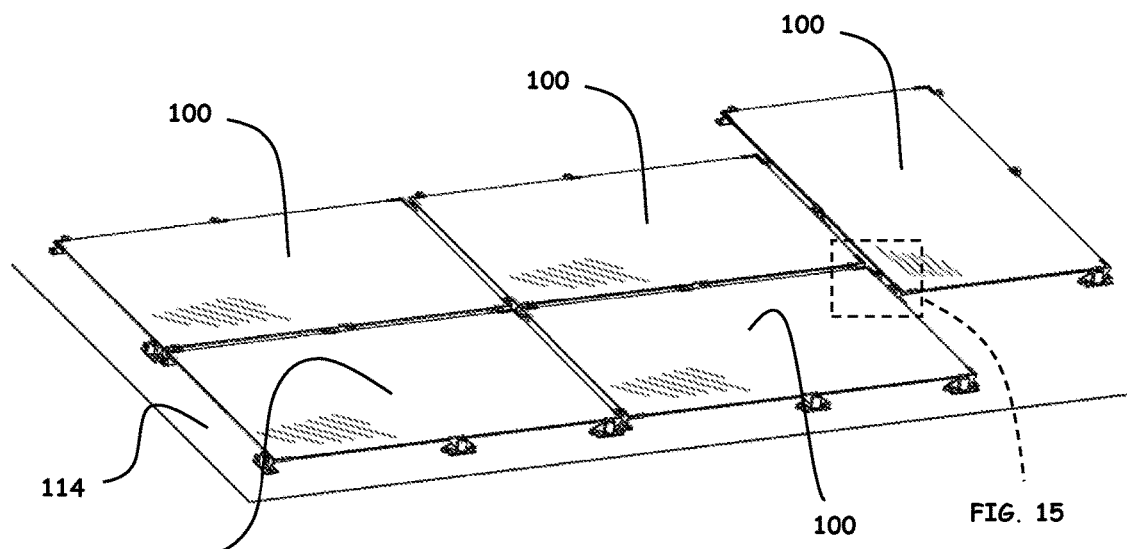
FIG. 2B is a perspective view of another configuration of the solar array shown in FIG. 2A.
Figure 15:
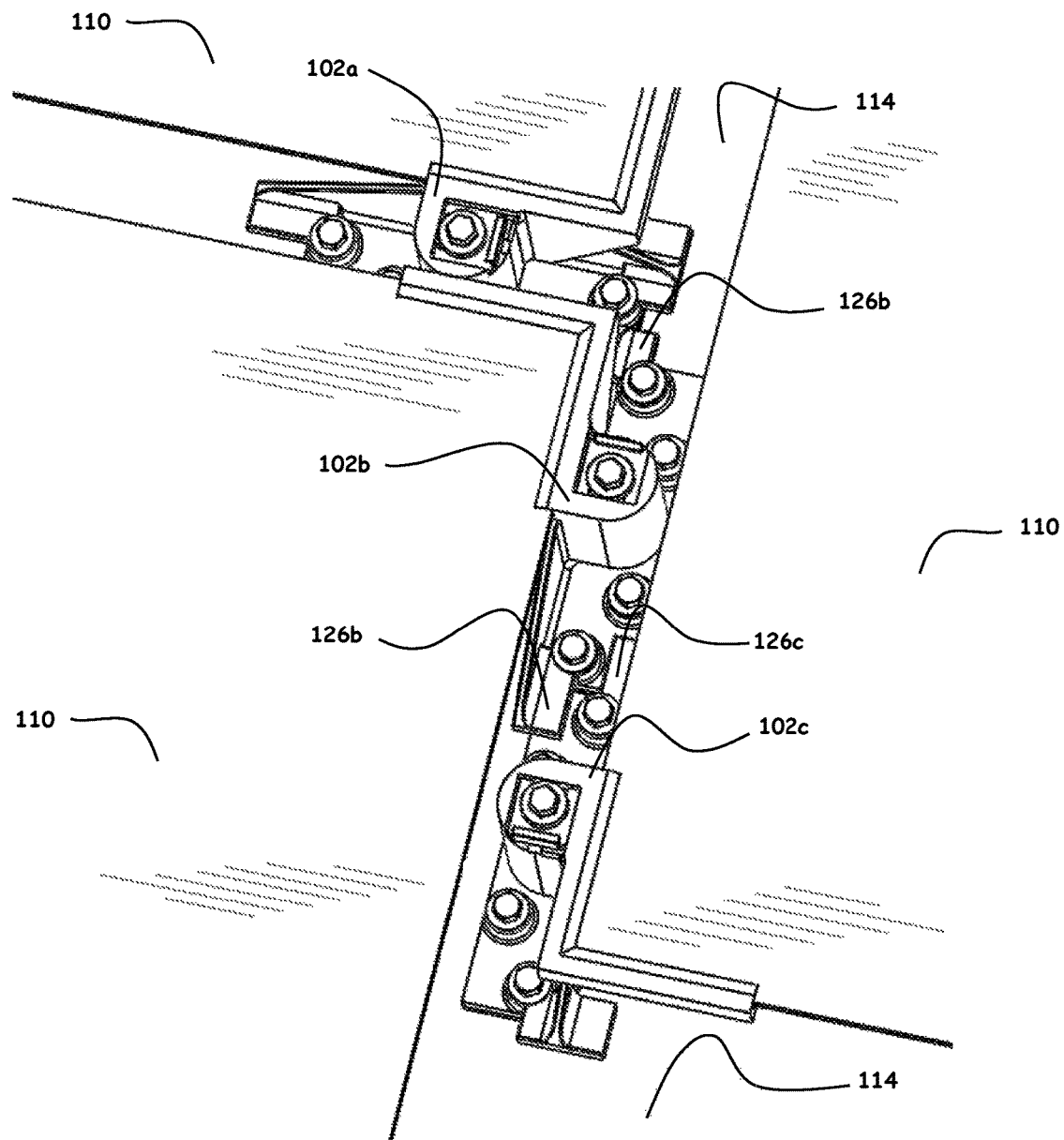
FIG. 15 is an enlarged perspective view of interlocked corner feet of three solar modules shown in FIG. 2B.

The feet 102, 104 provide increased flexibility in positioning the modules 100 on the structure. As a result, the modules 100 may be positioned in different positions on the structure. For example, as shown in FIG. 2B, at least one of the modules 100 may be offset from adjacent modules 100. Moreover, the adjacent offset modules 100 may be engaged as shown in FIG. 15. Specifically the feet 102, 104 may engage the feet 102, 104 of an offset adjacent solar module. In this embodiment, the corner feet 102 of adjacent solar modules 100 are engaged. In other embodiments, the side feet 104 of adjacent solar modules may be engaged. In further embodiments, the side foot 104 of a module 100 may engage the corner foot 102 of an adjacent module 100.

Figure 3:
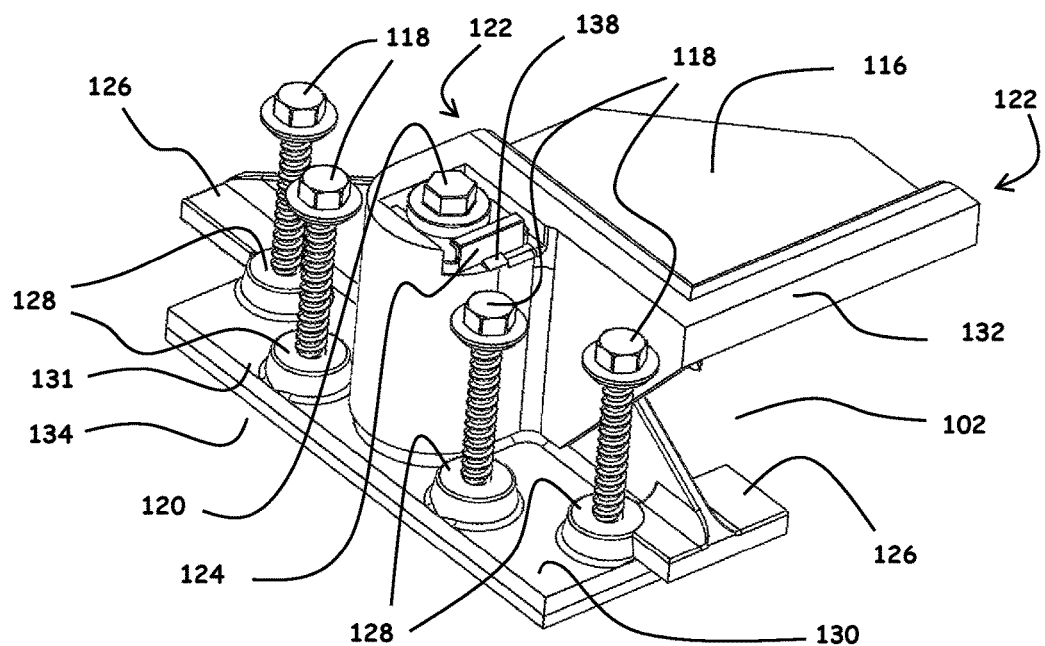
FIG. 3 is an enlarged view of a corner foot of the solar module shown in FIGS. 1A and 1B.
Figure 4:
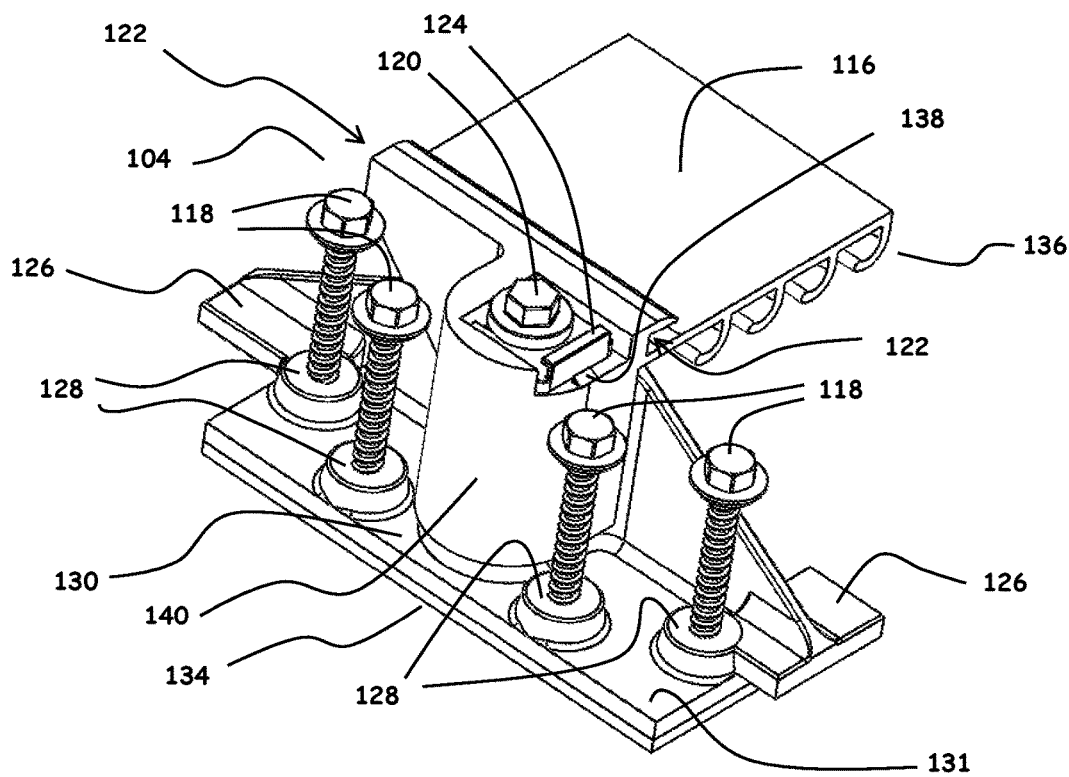
FIG. 4 is an enlarged view of an edge foot of the solar module.

FIG. 3 is an enlarged view of the corner foot 102 of the solar module. FIG. 4 is an enlarged view of the side foot 104 of the solar module. Each foot 102, 104 is attached to the structure surface 114. The structure surface 114 is, for example, a roof of a building. Furthermore, each foot 102, 104 is attached to and holds the solar laminate 110 in place. In some embodiments, the structure surface 114 is sloped and the feet 102, 104 secure the solar module 100 to the structure surface 114 to resist forces such as forces due to gravity, snow, precipitation and wind. The foot 102, 104 may contain a leveling mechanism 120 to enable leveling of the modules 100 such that the array 112 may be visually planar even if the underlying surface 114 is uneven. Also, the foot 102, 104 may enable easy removal for post-installation service or replacement of the module 100. In addition, the foot 102, 104 may contain cable retention features to keep array wiring from resting on the surface 114.

Each foot 102, 104 may include a leveling mechanism 120, a base 130, a top or support bracket 132, 140, flashing material 134, raised interfaces or holders 128, a release or lock or clip 124, and fasteners 118. The base 130 includes a lower planar portion 131, a guide 139 (shown in FIG. 7A), and a track 194 (shown in FIG. 7b). The lower planar portion 131 extends along the structure surface 114 and defines a mounting surface 141 facing the structure surface. The base 130 is secured to the structure surface 114 by one or more fasteners 118 extending through the lower planar portion. The guide 139 (shown in FIG. 5) extends from the lower planar portion 131 and connects to the support bracket 132, 140, which is attached to the laminate 110. The base 130 may be interchangeably with other bases and may connect to different support brackets. Accordingly, in this embodiment, the base 130 is a universal base. In alternative embodiments, the base 130 is configured in any manner that enables the solar module 100 to function as described. The fasteners 118 may be screws, nails, and other fastening devices.

Figure 6:
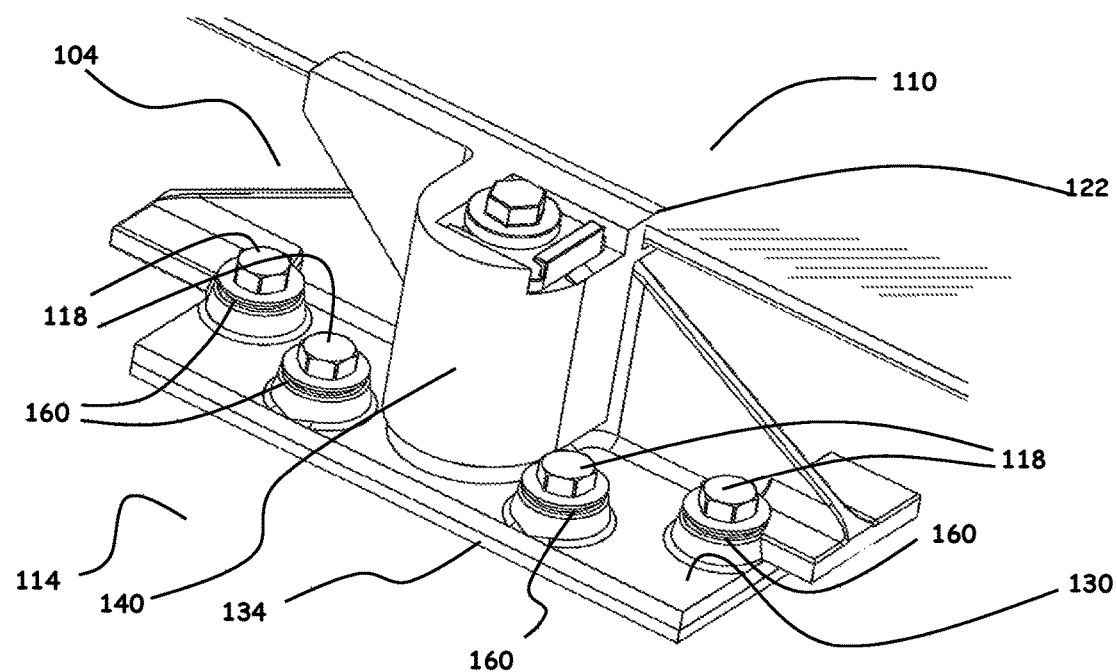
FIG. 6 is an enlarged view of the edge foot in a mounted configuration.
Figure 7A:
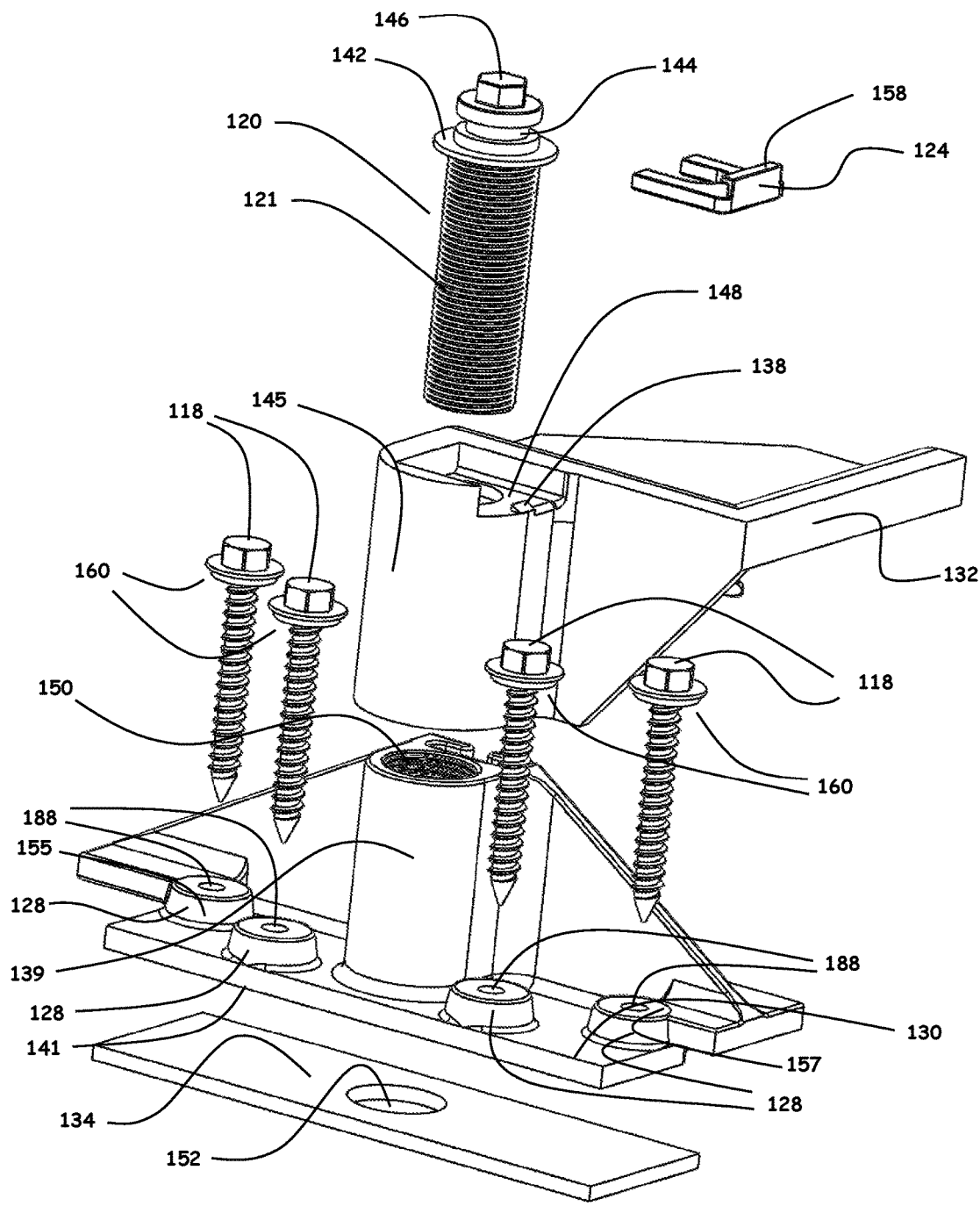
FIG. 7A is an exploded perspective view of the components shown in FIG. 3.
Figure 7B:
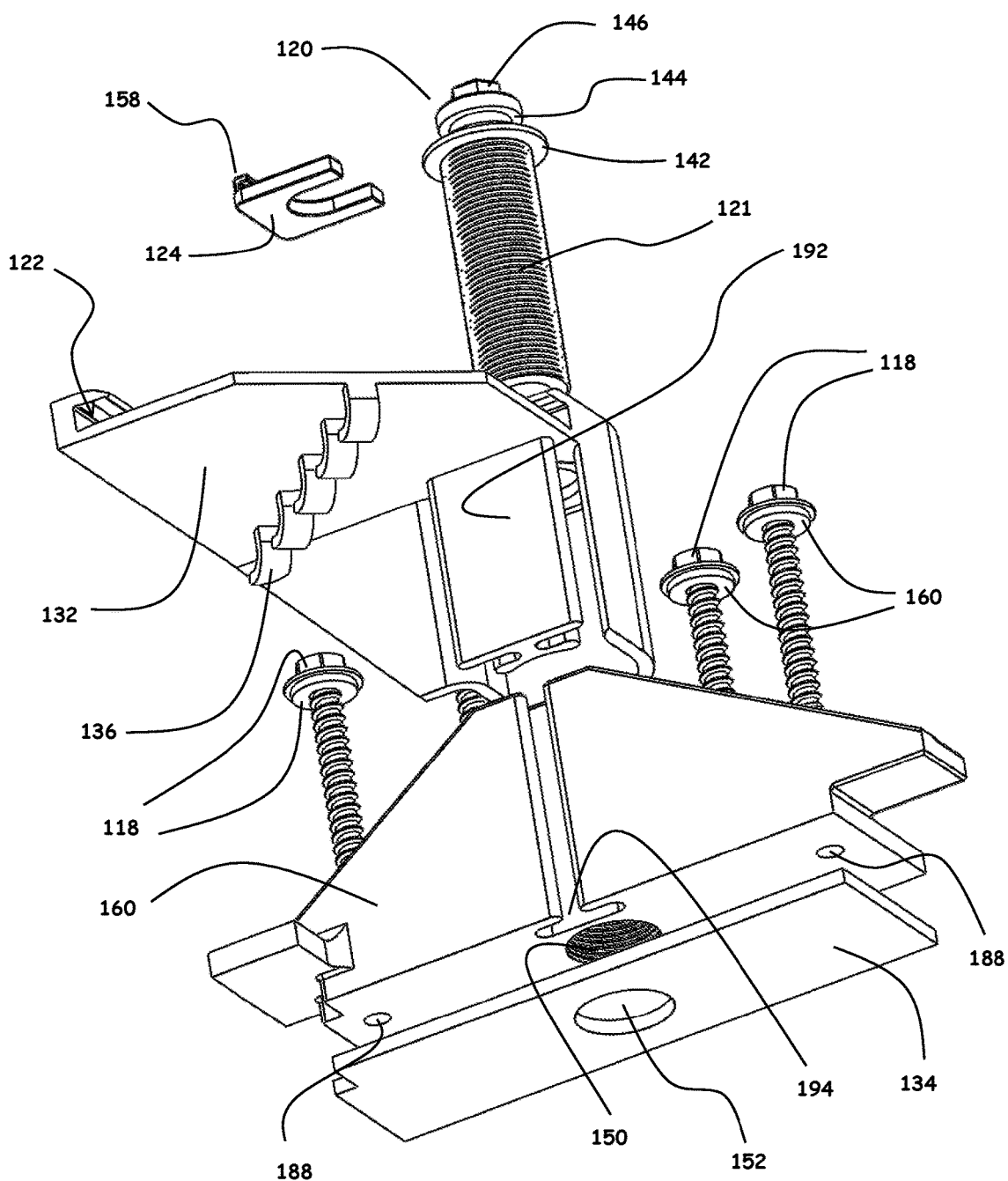
FIG. 7B is an exploded perspective view of the bottom of the components shown in FIG. 3.

As shown in FIGS. 7A and 7B, the support bracket 132, 140 of each foot 102, 104 includes a receiver 122, a sleeve 145, a slide 192, and a wire management device 136. The wire management device 136 includes hooks configured to secure a wire to the feet 102, 104. The slide 192 extends along the sleeve 145. The receiver 122 is sized and shaped to receive the laminate 110. In this embodiment, the receiver 122 includes sidewalls forming a C-shaped channel for receiving the laminate 110. The corner feet 102 (shown in FIG. 5) include L-shaped receivers 122 for receiving the corners of the laminate. The side feet 104 (shown in FIG. 6) include linear receivers 122 defining linear channels for receiving the edges 115 of the laminate 110. An adhesive pad 116 is positioned adjacent each receiver to attach the laminate to the foot 102, 104. In alternative embodiments, the support brackets 132, 140 have any receivers that enable the feet 102, 104 to function as described.

In one embodiment, the sleeve 145 of the support bracket 132, 140 is configured to movably connect to the base 130. Specifically, the sleeve 145 slides along the guide 139 such that the sleeve is movable relative to the base 130. The leveling mechanism 120 controls the position of the sleeve 145 relative to the base 130, as will be described below. In this embodiment, the guide 139 is removably received within the sleeve 145, such that the guide 139 and sleeve 145 telescope as the module level is adjusted, thus protecting the leveling fastener 120 and guide 139 from the elements, as well as improving aesthetics. The support bracket 132, 140 includes bearing plate 148 extending across the sleeve 145. In addition, the slide 192 is received in the bottom position track 194 as the module is adjusted. In other embodiments, the guide 139, the sleeve 145, the slide 192, and/or bottom position track 194 may not be required. In further embodiments, the guide 139, the sleeve 145, the slide 192, and/or the bottom position track 194 may be located on the support bracket 132, 140 and/or the base 130. The clip 124 couples the support bracket 132, 140 and the base 130 together as will be described below. In alternative embodiments, the feet 102, 104 have any support brackets that enable the feet to function as described. In other embodiments, the support bracket 132, 140 and the base 130 may be combined as a single part.

FIGS. 3 and 4 are an enlarged perspective views of the feet 102, 104 of the solar module 100 in a preassembled configuration. In the preassembled configuration, the fasteners 118 are at least partially retained in the base 130 of the foot 102, 104 prior to installation on the structure surface 114 such that the module 100 is a complete assembly ready for mounting on the structure surface 114 without additional parts. Specifically, the raised interfaces 128 define openings 188 for receiving the fasteners 118 and are configured to retain the fasteners in the openings prior to the solar module 100 being secured to the structure surface 114. Suitably, the preassembled configuration of the feet 102, 104 includes at least the number of fasteners 118 required to adequately secure the foot 102, 104 to the structure surface 114. Therefore, the solar module 100 can be mounted to the structure surface 114 without the use of additional fasteners 118. In some embodiments, each foot 102, 104 includes more fasteners 118 than are nominally required to adequately secure the foot to the structure. As a result, the installer may omit or skip securing some fasteners 118 that are difficult to reach and the foot 102, 104 will still be adequately secured to the structure surface 114. Also, more fasteners 118 than are nominally required may be used in cases where the strength of the structure surface 114 is unknown or suspect.

For example, the fasteners 118 allow the feet 102, 104 to be securely attached to the sheath material of the structure surface 114 rather than directly to underlying structure, such as the rafters or trusses in the case of a roof, or other structural elements. As a result, the solar module 100 allows flexibility in positioning the module and the array on the structure surface 114 without compromise to structural integrity of the structure surface 114. Also, mounting the module 100 directly to sheath material simplifies installation by eliminating the time-consuming need to locate the structural elements underneath the surface 114. In contrast, prior art systems using a pre-positioned mounting foot separate from the module require careful and time consuming layout of the array prior to module installation, and do not have the simplicity of installation of the fully integrated module described. In addition, some prior art systems require an installer to locate structural elements such as through trial and error from the topside, or by drilling exploratory holes which must then be weatherproofed.

Figure 11:
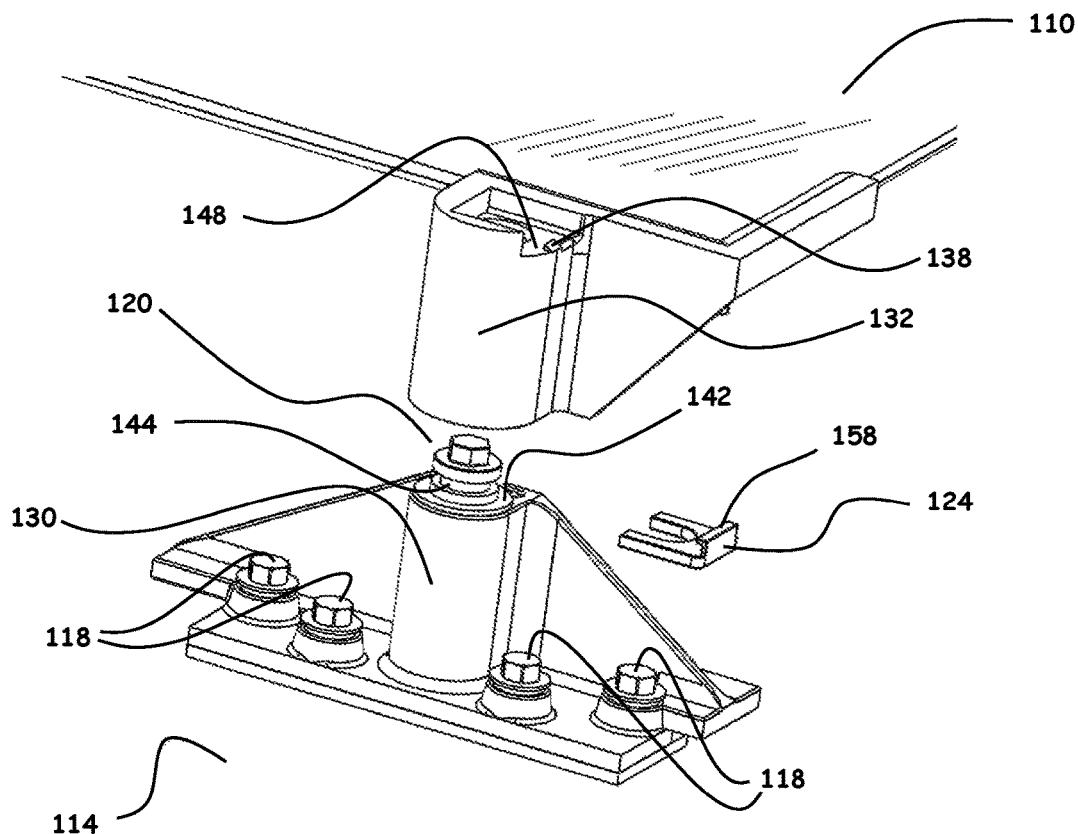
FIG. 11 is an enlarged perspective view of the corner foot in a released position.

In reference to FIG. 11, the clip, broadly a release, 124 is configured to enable the base 130 to be disconnected from the support bracket 132, 140 and, thereby, from the laminate 110. The clip 124 allows individual solar laminates 184 to be removed from the structure without removing adjacent solar laminates. In the illustrated embodiment, the clip 124 includes a clip removably attached to each foot. The clip 124 is received in a groove 144 in the leveling fastener 120. The clip 124 is moveable between a locked position (shown in FIG. 3) and a released position (shown in FIG. 11). In the illustrated embodiment, the clip is unattached to the mount and the laminate in the released position.

In this embodiment, the clip 124 has a u-shaped body. A tab 158 extends from a base of the clip 124 to facilitate a user positioning the clip. The clip 124 receives the leveling fastener within arms of the U-shaped body when the clip 124 releaseably connects to the foot 102, 104. In other embodiments, the clip 124 may have any configuration that enables the release to function as described.

A retainer 138 retains the clip 124 in the locked position until the clip is acted on by a desired force. The retainer 138 includes a projection, which causes the clip 124 to deform when the clip 124 is acted on by the desired force. The retainer 138 may be connected to the support bracket 132, 140 and/or the base 130. In the illustrated embodiment, the retainer 138 includes a projection extending from the sleeve 145. In alternative embodiments, the clip 124 may include any devices that enable the foot 102, 104 to function as described. For example, the clip 124 may include any of the following, without limitation, retaining rings, clevis pins, split rings, and the like. Accordingly, the clip 124 can provide assured retention and easy removability.

Figure 10:
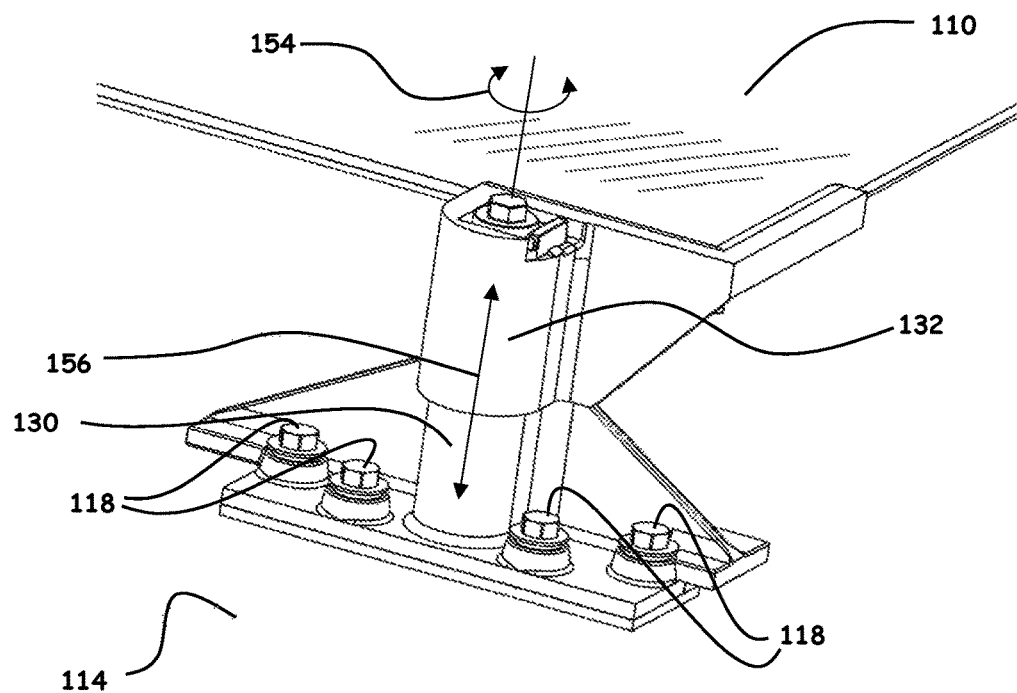
FIG. 10 is an enlarged perspective view of the corner foot with a leveling mechanism in an extended position.

As shown in FIGS. 10 and 7A, each foot 102, 104 further includes a leveling mechanism 120 for leveling the solar module 100 when the solar module is mounted on the structure surface. FIG. 7A is an exploded view of the components shown in FIG. 10. The leveling mechanism 120 is adjustable to adjust the position of the solar laminate 110 in relation to the foot 102, 104. As a result, the leveling mechanism 120 allows for independent leveling of each individual solar module 100 in the solar array 112 and at each point on the modules 100 where there is a foot. Moreover, the solar modules 100 may be leveled at any time during and after installation.

The leveling mechanism 120 includes a leveling fastener 120 extending through the base 130 and the support bracket 132, 140. The leveling fastener 120 is adjustable relative to the base 130 to adjust the position of the support bracket 132, 140 and the laminate 110 in relation to the foot 102, 104. For example, the leveling fastener 120 includes threads 121 that engage threads 150 of the base 130, a bearing plate 142, a lock groove 144, and a head 146. The leveling fastener 120 is adjusted by rotating the leveling fastener in a direction 154 about a rotation axis. The leveling fastener 120 is connected to the support bracket 132, 140 such that the support bracket is positionable with the leveling fastener. Specifically, in this embodiment, the clip 124 connects the support bracket 132, 140 to the leveling fastener 120 such that the support bracket moves in a longitudinal direction 156 with the leveling fastener. The clip 124 is received in the groove 144. Each leveling fastener 120 includes a threaded portion 121 that engages the base 130 and allows the leveling fastener to be screwed into the base in different positions. The leveling fastener 120 remains in position relative to the base 130 when the clip 124 is moved to the released position and the support bracket 132, 140 is disconnected from the leveling fastener. As a result, the support bracket 132, 140 may be reconnected to the base 130 at the leveled position without adjustment of the leveling mechanism 120. In alternative embodiments, the leveling mechanism 120 may have any configuration that enables the solar module 100 to function as described.

Each raised interface 128 includes a sidewall 155 and a raised surface 157 with an opening 188 through which the fasteners 118 attach the module to the support structure. Each opening 188 facilitates the fasteners being retained in the raised interfaces 128 prior to the foot 102, 104 being secured to the structure surface 114. Each raised interface 128 extends from the base 130 such that the raised surface 157 is a predetermined height above the mounting surface 141. The predetermined sidewall height, the diameter of the raised surface, and the diameter of the openings are determined based upon multiple considerations. The height must be sufficient for the raised interface 128 to capture a portion of the fasteners 118 during assembly and to frictionally inhibit the fasteners being released from the openings 188 of the raised interfaces prior to installation. For example, the openings 188 in the raised interfaces 128 may be slightly undersized for the fastener 118 and/or may contain protruding features, such that, upon introducing the fastener into the opening during assembly, the fastener is retained by frictional forces, or by the action of the fasteners screw thread. Alternatively, the openings 188 in the raised interfaces 128 may be threaded to receive and retain a screw fastener 118. The height of the sidewalls 156 and a diameter of the raised surface 157 may be selected to allow the raised interface 128 to sustain structural forces due to the fastener 118 and due to loads on the solar module 100. Also, the height may be selected to position the head of the fastener 118 and the top of the opening 188 above the height of normal flow of drainage water on the structure surface 114. As a result, the raised interfaces 128 prevent water penetrating the openings 188 and potentially being channeled through the openings 188 to the mounting surface 141. In alternative embodiments, the feet 102, 104 may include any raised interfaces 128 that enable the feet to function as described.

Figure 5:
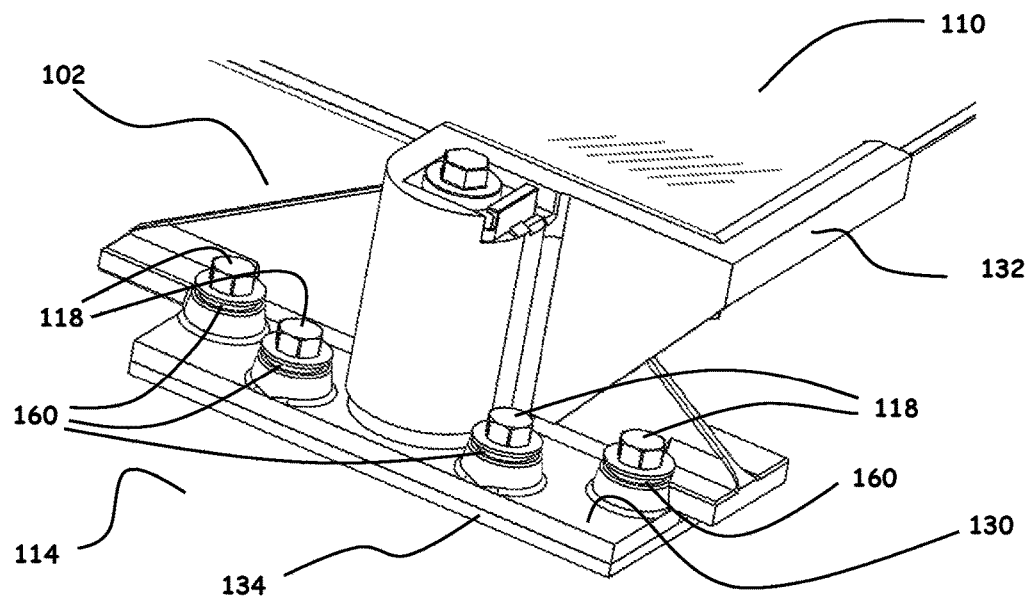
FIG. 5 is an enlarged view of the corner foot in a mounted configuration.

In reference to FIG. 5, the flashing material 134 is disposed between the mounting surface 141 and the structure surface 114. The flashing material 134 may be any material that facilitates a watertight seal between the structure surface 114 and the base 130. In this embodiment, the flashing material 134 is made of a compliant rubber, such as butyl, and is adhered to the mounting surface 141. In other embodiments, any sealant or gasket materials can be used, including polymers and room temperature vulcanization silicone. The flashing material 134 provides a barrier that inhibits fluid flowing between the base 130 and the structure surface 114. In addition, the flashing material 134 can conform to any irregularities or undulations of the structure surface 114 when compressed by the fastener 118. In addition, the flashing material 134 is aligned with the openings 188 (shown in FIG. 4) such that the fasteners 118 extend through the flashing material when the fasteners are secured to the structure surface 114. Accordingly, portions of the flashing material 134 adhere to the fasteners 118 and fill gaps in the structure surface 114 around the fasteners. In some embodiments, the fasteners 118 extend through multiple layers of the structure and the flashing material 134 fills gaps in the layers. As a result, the flashing material 134 inhibits moisture penetrating into the structure around the fasteners 118. In alternative embodiments, the flashing material 134 has any configuration that enables the solar module 100 to function as described.

Also, in some embodiments, a sealing washer or gasket 160 is positioned on each fastener 118 prior to assembly to the feet 102, 104. Specifically, the sealing washer or gasket 160 is positioned between the raised surface 157 (shown in FIG. 6) of the raised interface 128 and a head of the fastener 118. The sealing washer 160 inhibits fluid entering the openings 188 and penetrating the structure surface 114 and may be made of a variety of sealing materials including rubber or polymer. In alternative embodiments, the solar module 100 may include any sealing components that enable the solar module to function as described.

In reference to FIGS. 12-15, the feet 102, 104 of adjacent solar modules 100 interlock when the solar modules are assembled in the solar array 112. In particular, each foot 102, 104 includes an interlock 126 that overlaps a portion of the lower planar portion 131 of the foot of an adjacent solar module 100. The interlocks 126 facilitate aligning the solar modules 100 on the structure surface 114. Moreover, one or more of the solar modules 100 may be secured to the structure surface 114 by the interlocks 126 or by a combination of the fasteners 118 and the interlocks. Accordingly, some fasteners 118 included in the preassembled configuration of the solar module 100 may be unnecessary for securing the solar module to the structure. As a result, the interlock 126 may allow an installer to omit or skip securing some fasteners 118 that are difficult to access, such as fasteners that would require the installer to reach across the solar module 100. The required minimum number and distribution of the fasteners 118 can be determined with respect to the properties of the structure surface 114, with respect to the expected loads, and with reference to any operative design standards and regulations. For example, more fasteners 118 may be required to mount a heavier module, a module in a location with inclement weather, or a module to a weak or variable structure surface 114. Accordingly, the installation time of the solar modules 100 may be significantly reduced by the provision of multiple, preassembled fasteners 118.

Figure 12:
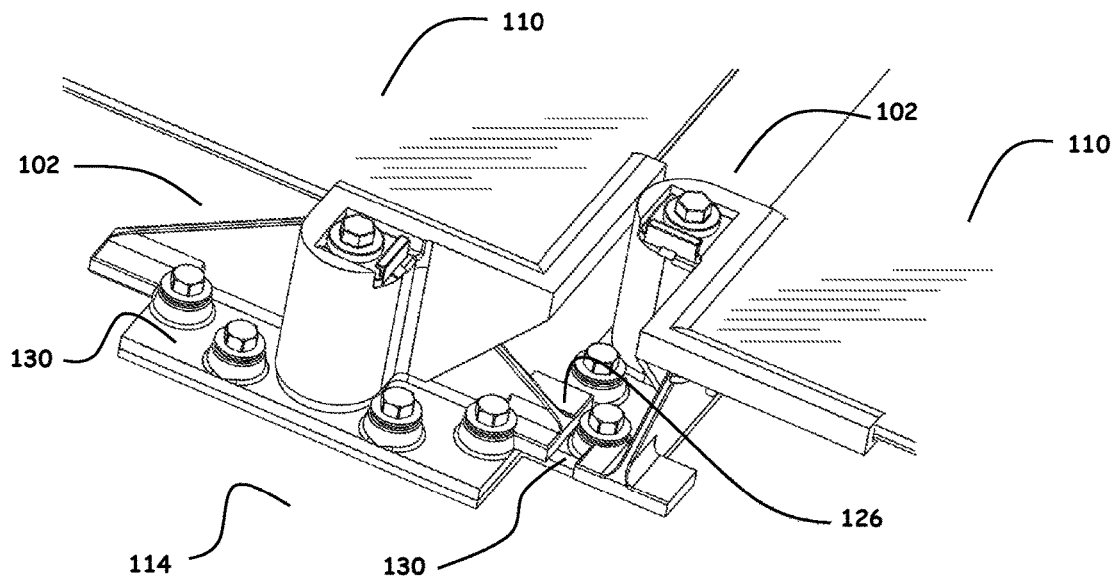
FIG. 12 is an enlarged perspective view of interlocked corner feet of two solar modules.
Figure 13:
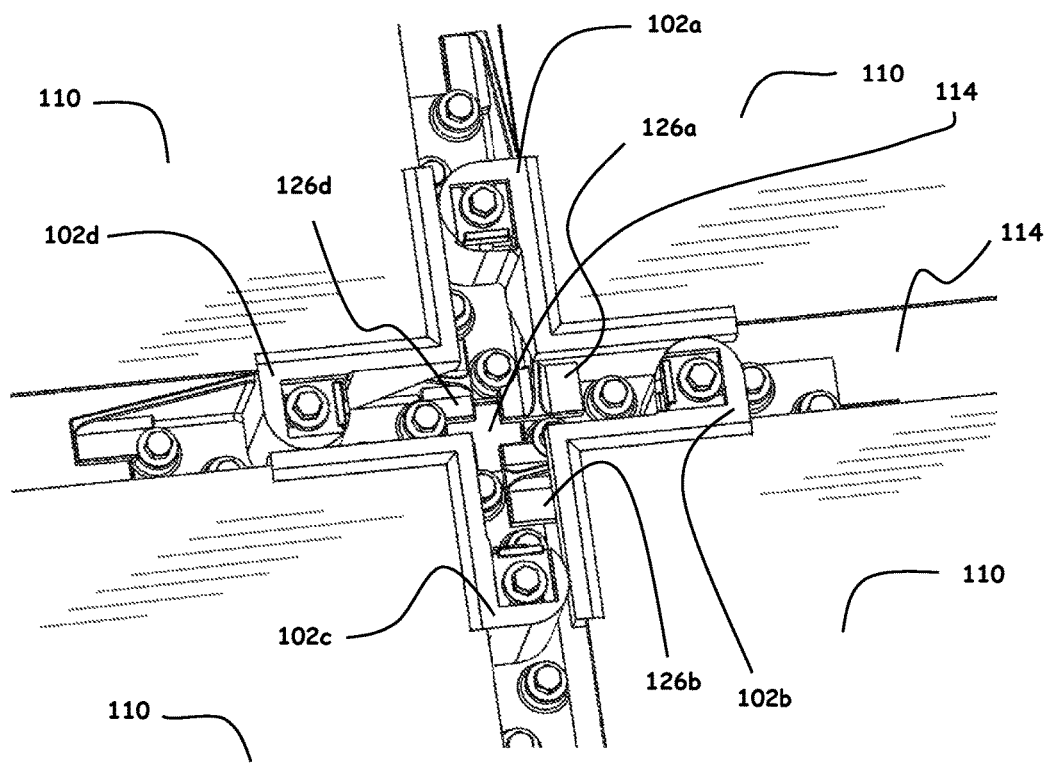
FIG. 13 is an enlarged perspective view of interlocked corner feet of four solar modules shown in FIG. 2A.
Figure 14:
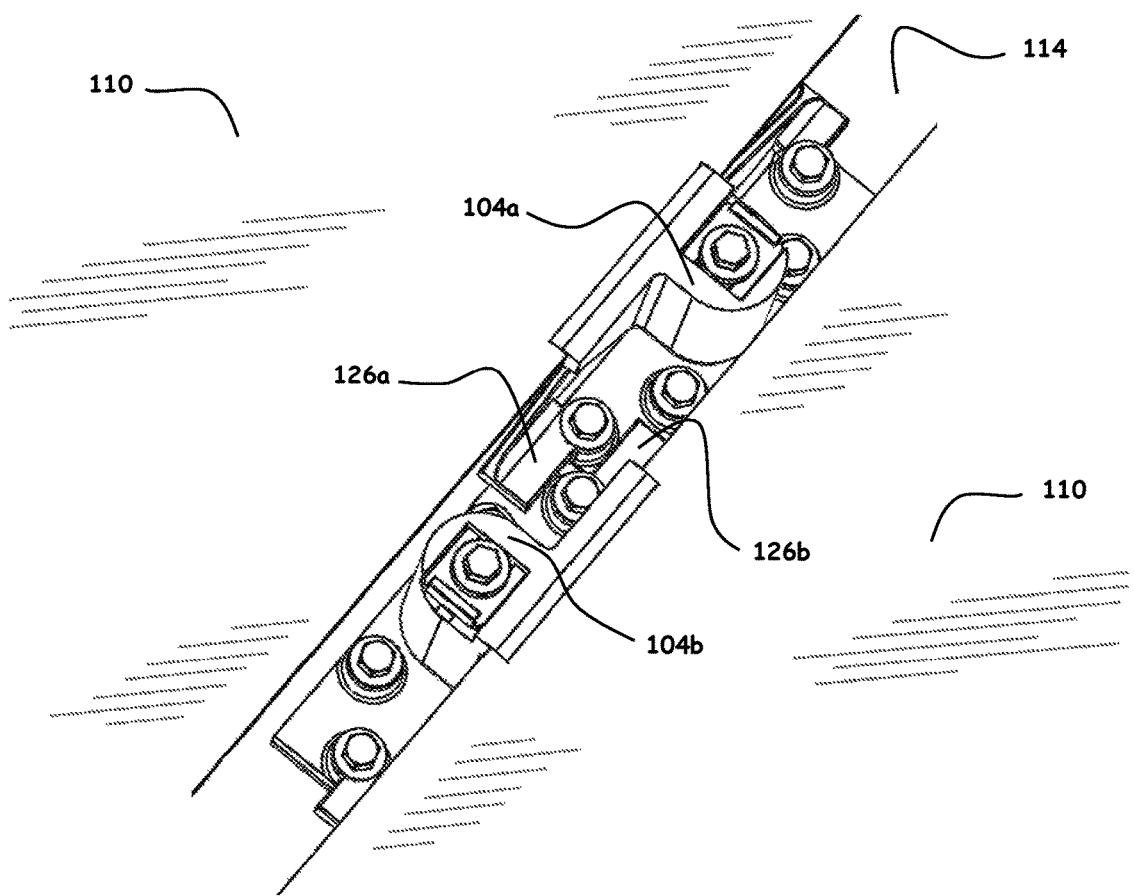
FIG. 14 is an enlarged perspective view of interlocked edge feet of solar modules shown in FIG. 2A.

Some embodiments of the interlock 126 only hold down adjacent modules 100 and do not connect with them. This design facilitates easy installation. However, if only two corner feet 102 are interlocked only one receives the additional support as shown in FIG. 12. However, if four corner feet 102 are interlocked at the corners 117 as shown in FIG. 13 then all feet are held down by their neighbor. Similarly, two side feet 104 interlock with each other such that they hold each other down as shown in FIG. 14.

Figure 17:
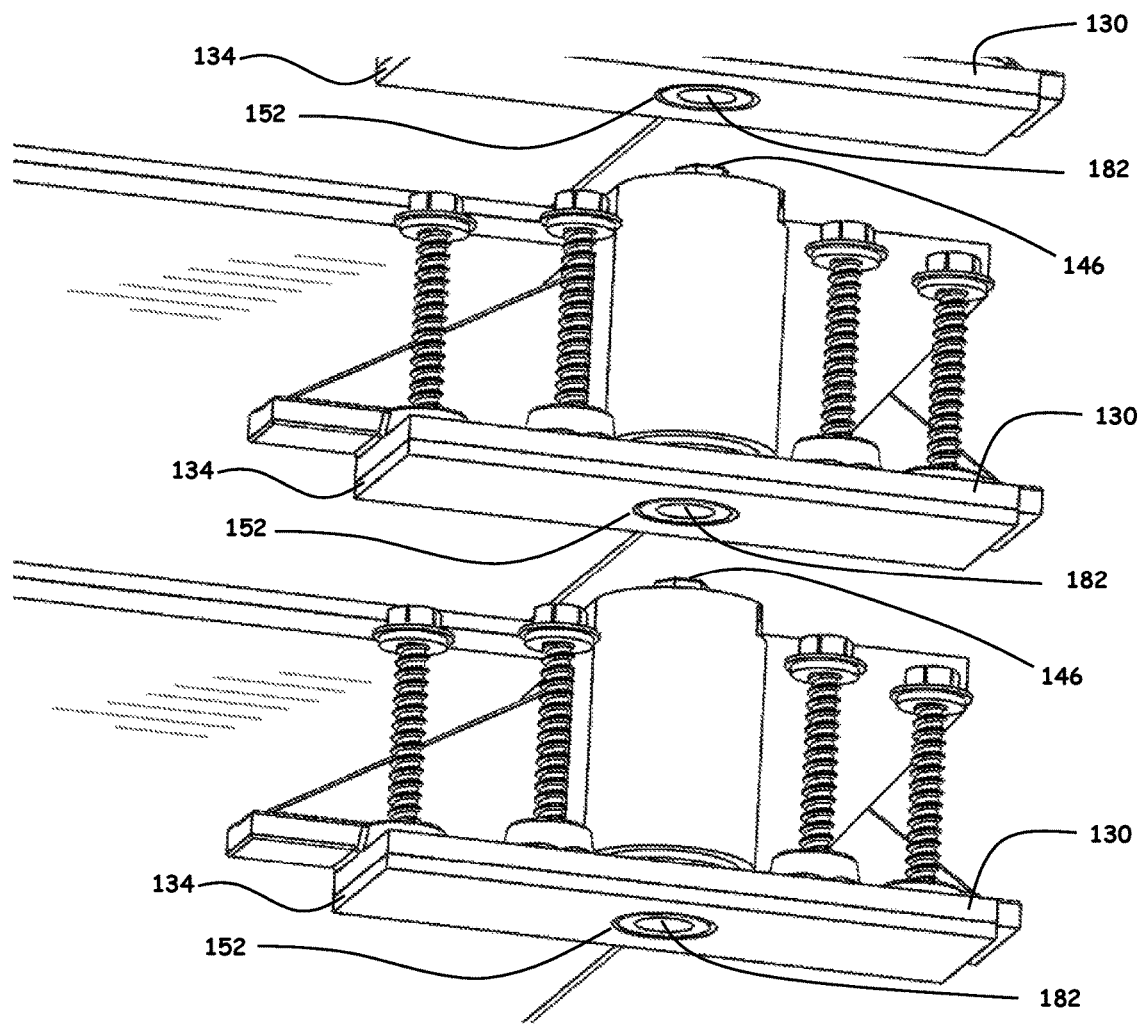
FIG. 17 is an enlarged perspective view of a lower foot aligned with an upper foot.
Figure 18:
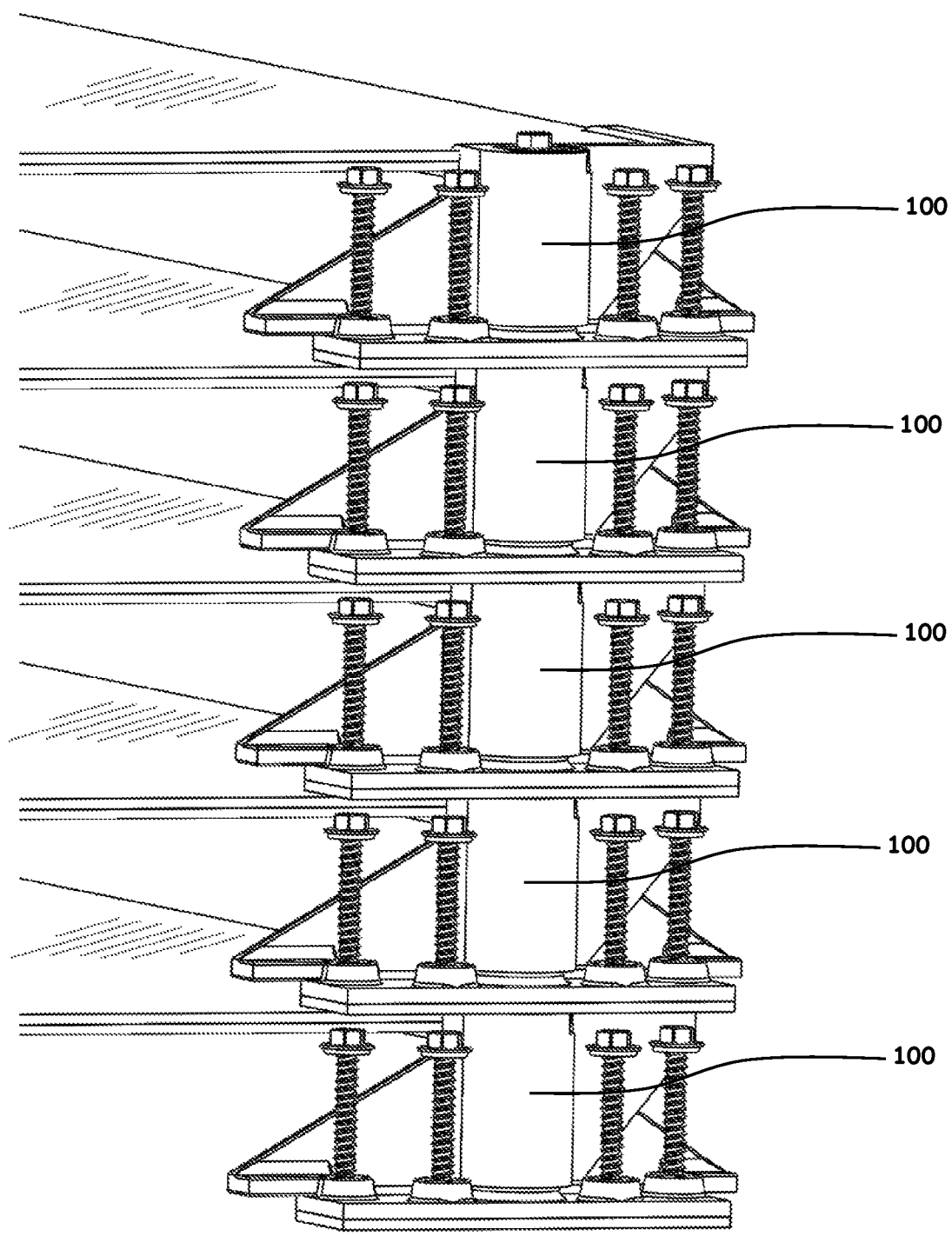
FIG. 18 is an enlarged perspective view of stacked solar modules.

In reference to FIGS. 17 and 18, the solar modules 100 are configured to stack together for economical packing and shipping. The feet 102, 104 of the solar modules 100 align vertically and engage each other to support the solar laminates 110 in a stacked position. In particular, the mounting surface 141 of an upper foot 102, 104 includes an opening 152 for receiving a portion of a lower foot 102, 104 of another solar module 100. In this embodiment, the leveling fastener 120 of the upper foot 102, 104 defines a cavity of locator 182 sized to receive the leveling fastener 120 of the lower foot 102, 104. Accordingly, the leveling fastener 120 of the lower foot 102, 104 extends through the opening 152 in the mounting surface 141 of the upper foot 102, 104 and engages the leveling fastener 120 of the upper foot 102, 104. Accordingly, the leveling fasteners 120 allow the feet 102, 104 to have a reduced thickness. In other embodiments, the leveling fasteners 120 may engage the base 130 instead of or in addition to other fasteners 120.

In the stacked position, the feet 102, 104 protect and space the solar laminates 110 of the solar modules 100 apart. As a result, the amount of packaging components, such as clips and spacers, required to ship the solar modules 100 is reduced. In alternative embodiments, the solar modules 100 may be stacked and/or packaged in any manner that enables the solar modules to function as described.

Each of the solar modules 100 is preassembled for direct mounting to a structure. Specifically, each solar module 100 is preassembled as a single unit including all components, such as wire management devices, fasteners, and flashings required to install the solar module 100 to the structure 114. Other embodiments might also include module-mounted power conversion or monitoring devices. In particular, each solar module includes captive fasteners 118 to reduce the need for external fastening components. Any number, including just one module, of the solar modules 100 can be shipped in the preassembled and/or stacked configurations, and installed as a single unit or as an array including any number of modules. As a result, the solar modules 100 are simpler to ship and install.

Also, in reference to FIGS. 2A, 5, and 12, the solar modules 100 include at least three redundant features for securing the solar modules 100 to the structure surface 114. First, in some embodiments, the feet 102, 104 may provide more connection points than are required to secure the solar module 100 to the structure surface 114. For example, each illustrated solar module 100 includes six feet 102, 104 while only four connection points may be required to resist wind loading. As a result, the feet 102, 104 provide redundancy if some connection points fail. Second, in some embodiments, more fasteners 118 are included than are required to secure the feet 102, 104 to the structure surface 114. For example, in this embodiment, each solar module 100 includes four fasteners 118 while only two fasteners may be required. As a result, there are sufficient fasteners 118 on each foot 102, 104 to secure the foot if the connection of one of the fasteners to the structure surface 114 fails. Third, the solar module 100 may be sufficiently secured by the interlocks 126 on adjacent solar modules 100 if the feet 102, 104 and/or the fasteners 118 fail.

Figure 8:
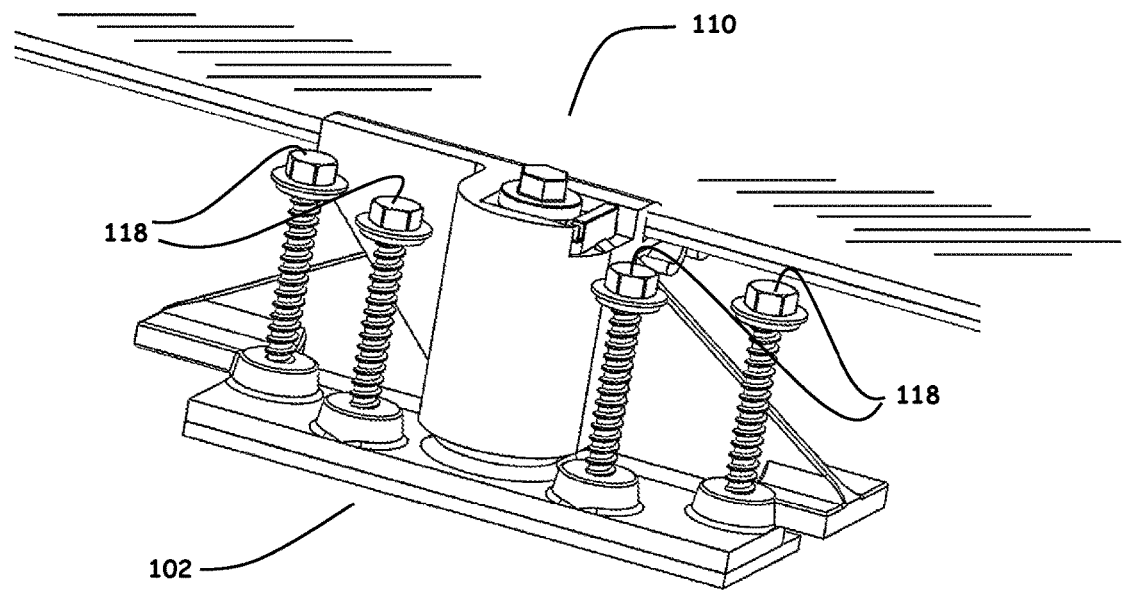
FIG. 8 is an enlarged perspective view of the edge foot of the solar module in a pre-mount configuration.
Figure 9:
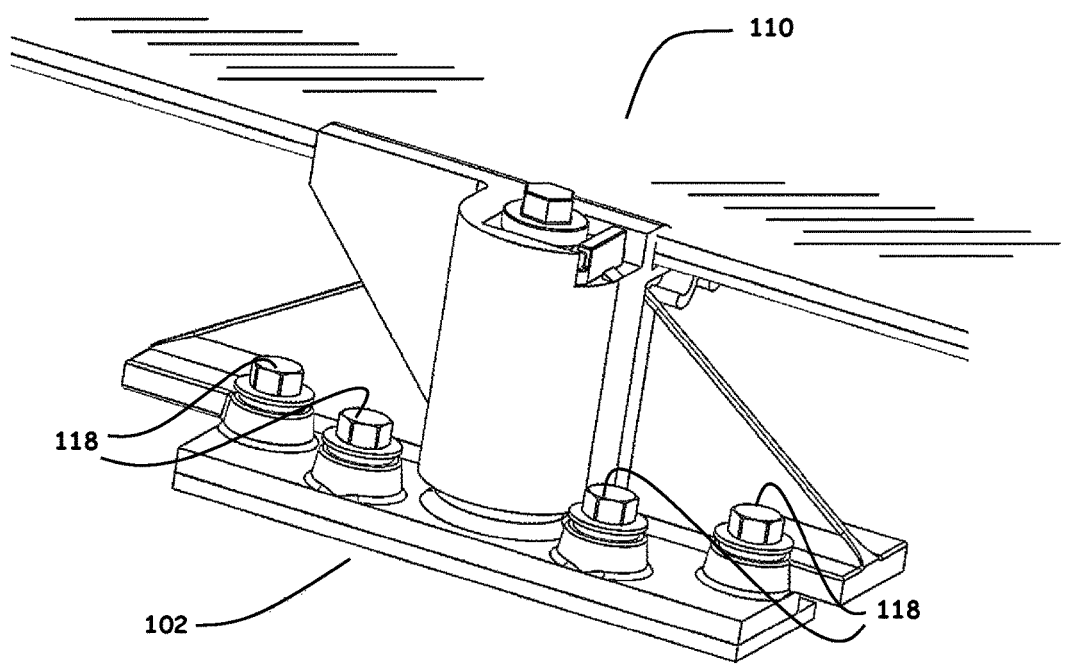
FIG. 9 is an enlarged perspective view of the edge foot in a mounted configuration.

During installation and assembly of the solar array 112, an installer positions a first solar module 100 on the structure surface 114 in a desired position. In the preassembled configuration of the solar module 100 shown in FIG. 8, the fasteners 118 are captive or preinstalled in the foot and pre-aligned for installation. More specifically, the fasteners 118 are retained in the raised interfaces 128. As a result, the installer may use a tool, such as a manual or motorized screwdriver or socket wrench or hammer, and a top down tool engagement method to secure the fasteners 118 through the feet 102, 104 as shown in FIG. 9. In a mounted configuration, the fasteners 118 extend through the feet 102, 104 and the structure surface 114 to secure the solar module 100 in position as shown in FIG. 9. During or after the installation, the installer may adjust one or more of the leveling fasteners 120 to level the solar module 100 in relation to the structure surface 114. The installer then positions a second solar module 100 on the structure surface 114 adjacent the first solar module 100. The installer may interlock the feet 102, 104 of the second solar module 100 and the feet 102, 104 of the first solar module 100 as shown in FIGS. 12-15, such that the interlock 126 of one solar module 100 overlays and constrains the lower planar portion 131 of an adjacent module 100. The installer may then secure the feet 102, 104 of the second solar module 100 to the structure surface 114 with at least some of the fasteners 118. The installer may repeat the process for any number of solar modules 100 to assemble the solar modules in the solar array 112.

Figure 19:
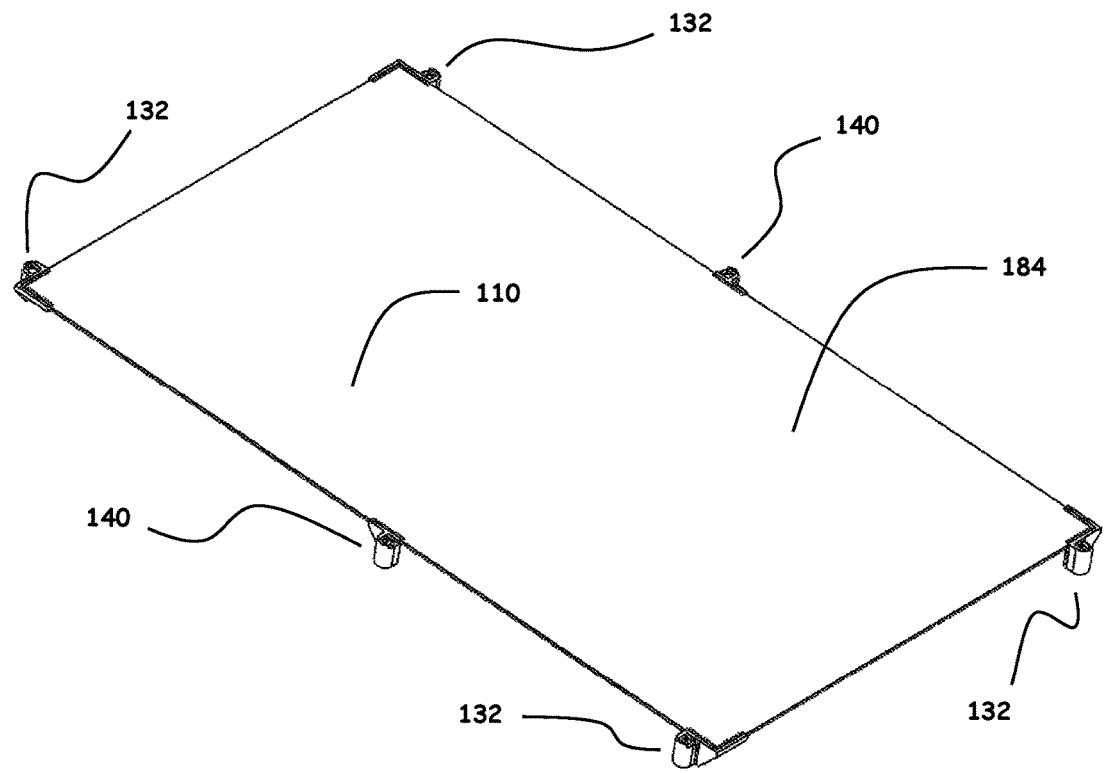
FIG. 19 is a perspective view of a replacement solar module.

As shown in FIG. 11, to remove one of the solar modules 100, such as for service or repair, the clip 124 may be moved to the released position by applying a force to the clip sufficient to overcome the retainer 138. The support bracket 132, 140 and the solar laminate 110 form a replaceable laminate 184 as shown in FIG. 19 that may then be removed from the base 130. To reattach the replaceable laminate 184, each of the support brackets 132, 140 are reengaged with the base 130 and the clip 124 is moved to the locked position. In some embodiments, the clip 124 is reconnected to the leveling fastener 120 such that the solar module 100 is reattached in the same leveling position as prior to the detachment.

Figure 16:
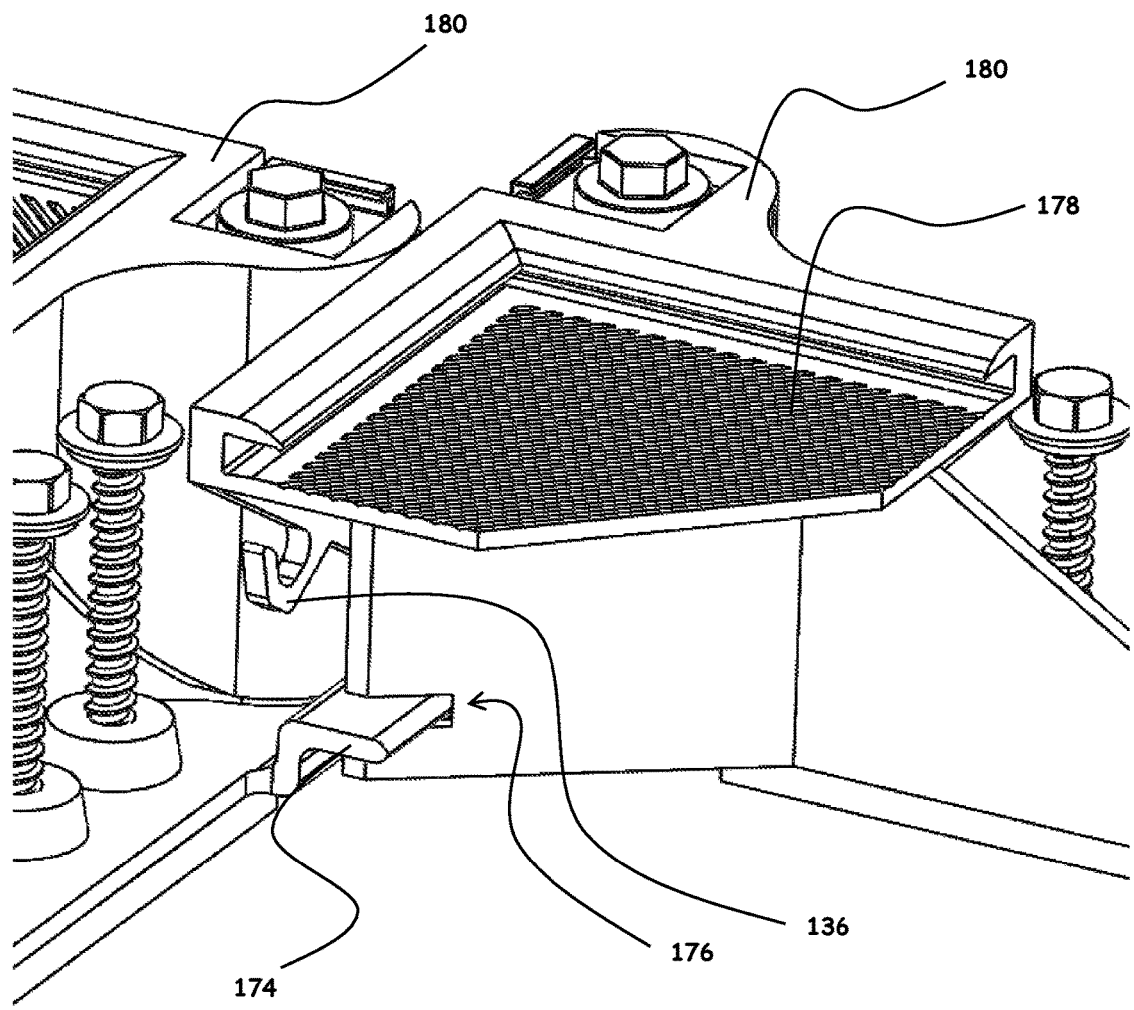
FIG. 16 is an enlarged perspective view of an alternative embodiment of corner feet for a solar module.

FIG. 16 is an enlarged perspective view of an alternative embodiment of a corner foot 180 for the solar module 100. The foot 180 includes a wire management device 136, a hold down tab 174, a hold down clevis 176, and a roughened adhesive pad 178. The wire management device 136 includes a hook configured to secure a wire to the foot 180. The roughed adhesive pad 178 attaches to the laminate when the laminate is received by the foot. The illustrated foot 180 is configured to attach to a corner of the laminate. In other embodiments, the foot 180 may attach to an edge of the laminate.

The hold down clevis 176 includes an opening or slot extending into the foot 180 and sized to receive the hold down tab 174 of an adjacent foot 180. Hold down tab 174 extends from and along the foot 180. In addition, the hold down tab 174 includes angled and linear portions such that the hold down tab 174 is spaced from the bottom of the foot 180 and is received by the hold down clevis intermediate the top and bottom of the foot 180.

During installation, a first foot 180 is position on the structure surface and a second foot 180 is positioned adjacent the first foot 180 such that the hold down tab 174 extends into the hold down clevis 176. Accordingly, the feet 180 secure each other in position on the structure surface when at least one of the feet 180 is mounted to the structure surface.

FIG. 19 is a perspective view of a replacement solar module 184. For example, solar module(s) 184 may be used to replace the solar module(s) 100 when the solar module(s) 100 are damaged, defective, not working properly, and/or otherwise required to be replaced. In particular, the solar module 100 may be removed and the solar module 184 may be installed while the feet 102, 104 remain in position and secured to the structure. As a result, the cost to replace the solar modules 100 is reduced. Moreover, damage to the structure from removing the solar modules 100 may be prevented.

A method of retrofitting or replacing a solar laminate 110 with a replacement solar laminate 110 includes releasing the lock 124 on the solar module 100 and removing the solar laminate 110. Next, the replacement solar laminate 110 is placed into the mount 102, 104 and secured to the mount. Accordingly, any the solar laminates 110 of solar modules 100 may be removed and, if necessary, replaced manually without the use of tools and without repositioning the mounts 102, 104.

Figure 20:
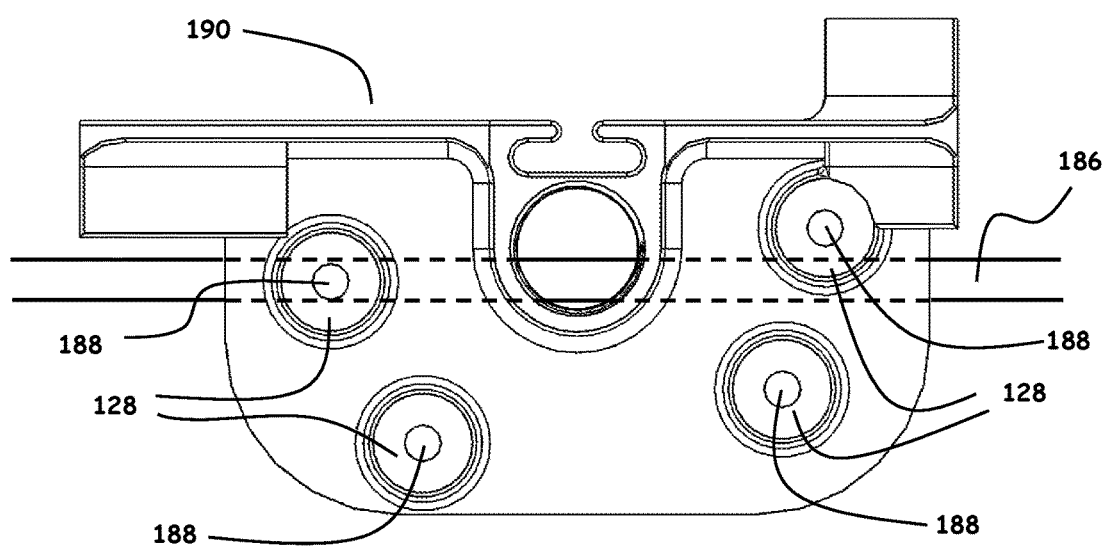
FIG. 20 is a plan view of a foot including openings arranged in an asymmetric pattern.

FIG. 20 is a plan view of a base 190 of a foot 102, 104 including raised interfaces 128 arranged in an asymmetric pattern. Raised interfaces 128 include openings 188 configured to receive fasteners 118. Accordingly, fasteners 118 are positioned in an asymmetric pattern in the openings 188 when fasteners 118 are positioned in openings 188. For example, the openings 188 are equal distance from a first axis of up force or down force but offset about a perpendicular axis from the first axis that is also parallel to the edge of the laminate and gaps in the structural elements such that no more than one opening intersects with the gaps in the structural elements. As a result, the asymmetric pattern ensures that at least some openings 188 are offset from a gap 186 between structural elements such as roof sheathing. Accordingly, foot 102, 104 increases the likelihood that fasteners 118 will extend into structural elements to securely mount the module 100 in position. The base 190 may include any number of the raised interfaces 128 and openings 188. In this embodiment, the base 190 includes four raised interfaces 128 and openings 188 arranged in an asymmetric pattern. In other embodiments, some of the openings 188 may be symmetric about an axis. In further embodiments, the base 190 may include at least two openings 188 arranged in an asymmetric pattern.

Figure 21A:
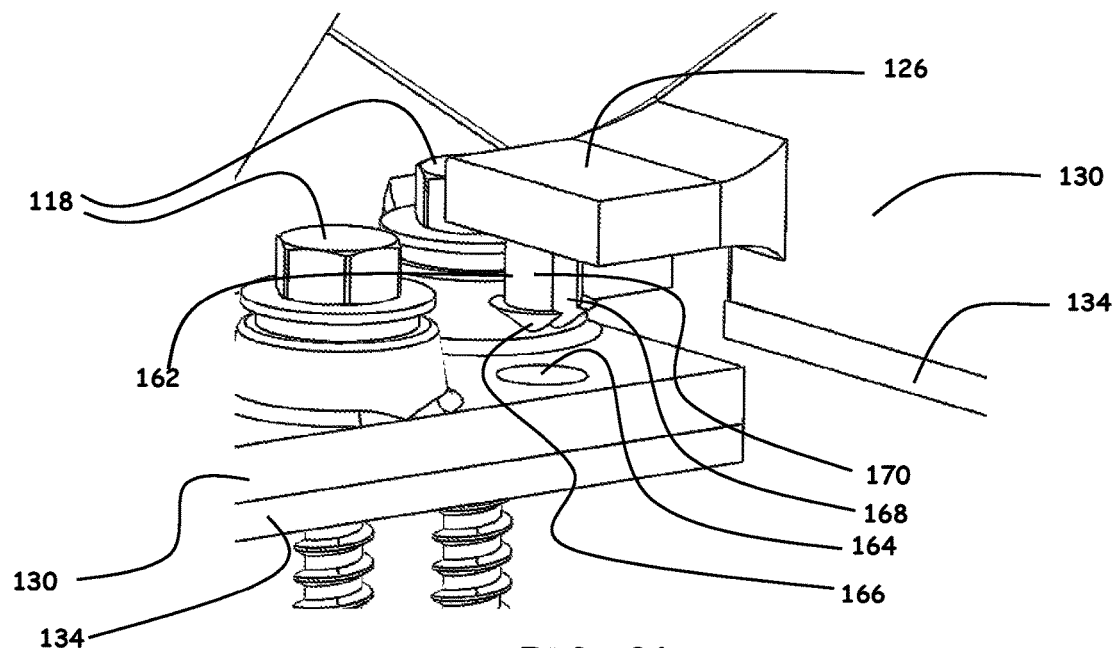
FIG. 21A is an enlarged perspective view of engagement of feet on adjacent solar modules.
Figure 21B:
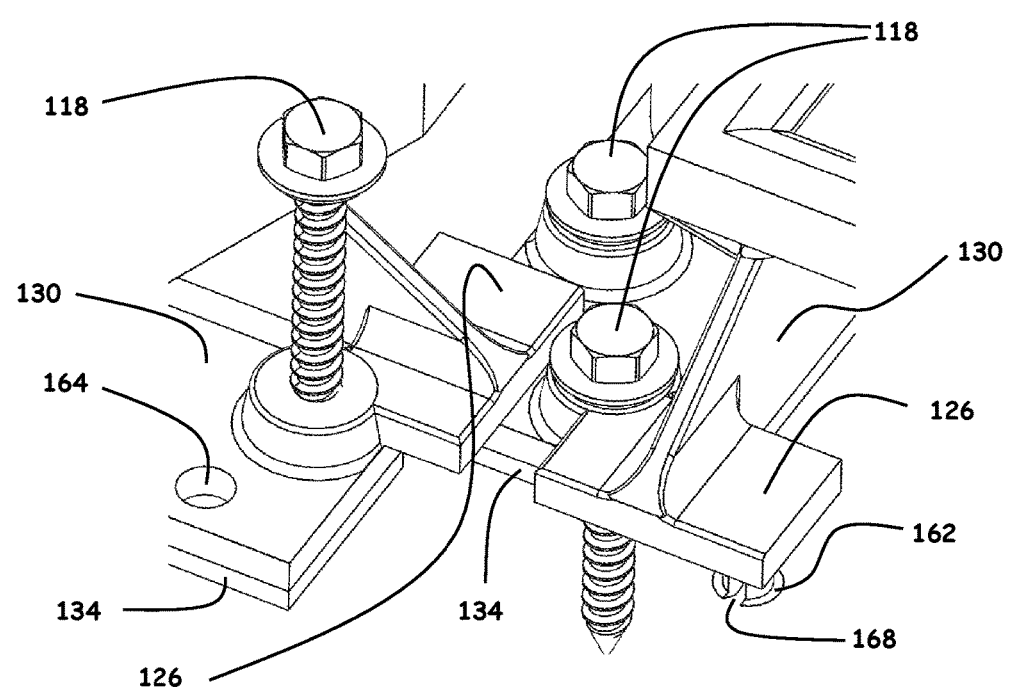
FIG. 21B is an enlarged perspective view of engaged feet on adjacent solar modules.
Figure 21C:
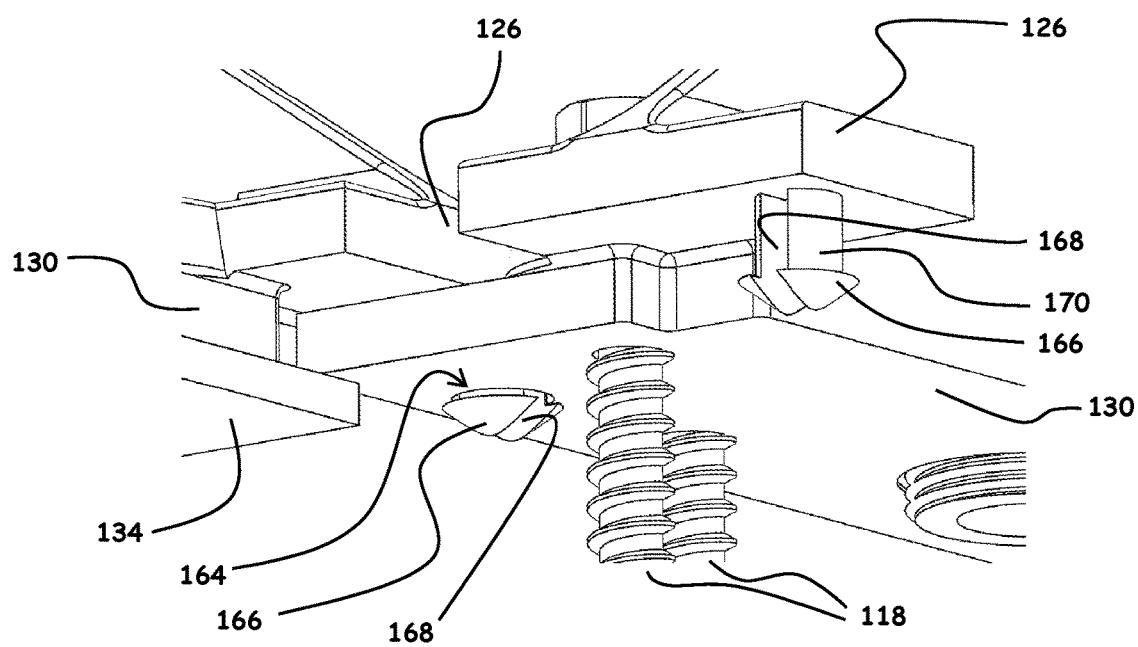
FIG. 21C is an enlarged perspective view of a bottom of an interlock of a foot.

As shown in FIGS. 21A-C, feet 102, 104 may include hold downs that allow adjacent feet 102, 104 to engage a secure each other in position. In particular, the hold downs may resist forces in multiple directions such that either of the adjacent feet 102, 104 may be mounted to the surface and secure the other foot 102, 104 in position. In this embodiment, each foot 102, 104 includes a hold down connector 162 and an opening 164. The hold down connector 162 includes a shaft 170 and a flange 166. The shaft 170 includes portions separated by a gap 168 which facilitates the connector 162 flexing and deforming. To connect the feet, the connector is inserted into the opening 164 such that the flange 166 and/or the shaft 170 flex and/or deform. When fully inserted, the connector 162 is received in the acceptor such that the flange 166 engages the base 130 of the adjacent foot 102, 104 and the feet 102, 104 are secured together. In alternative embodiments, the feet 102, 104 may include any hold down that enables the feet 102, 104 to function as described.

Figure 22A:
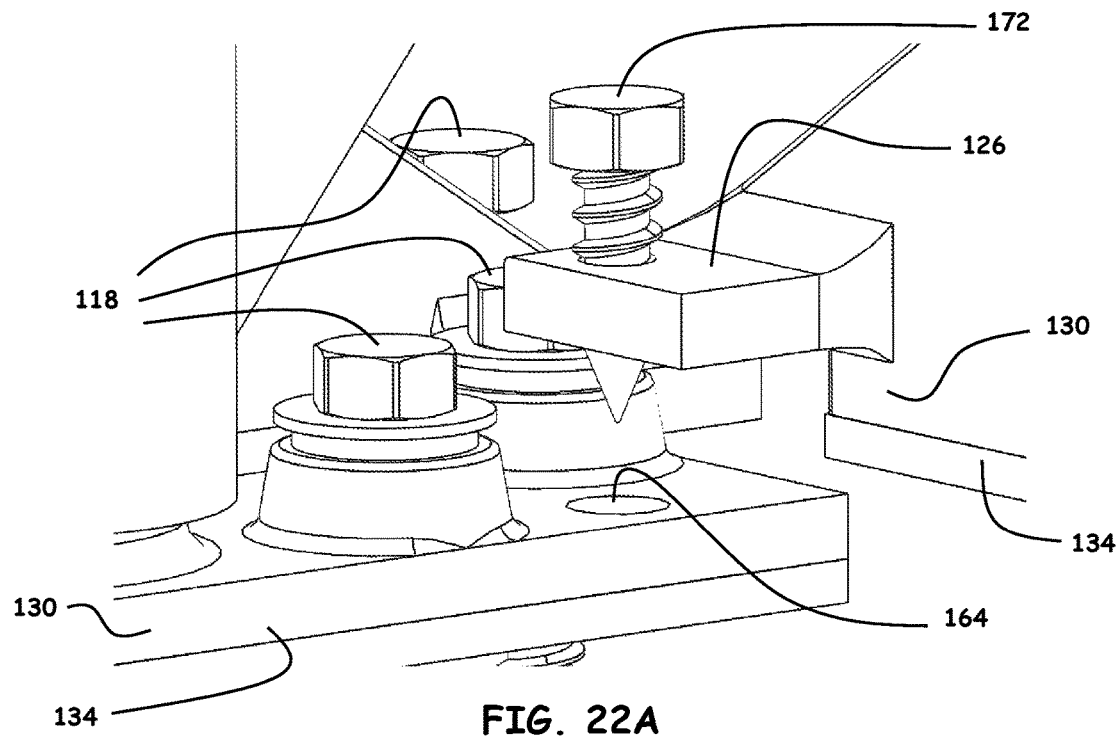
FIG. 22A is an enlarged perspective view of feet including a fastener to secure adjacent feet together.
Figure 22B:
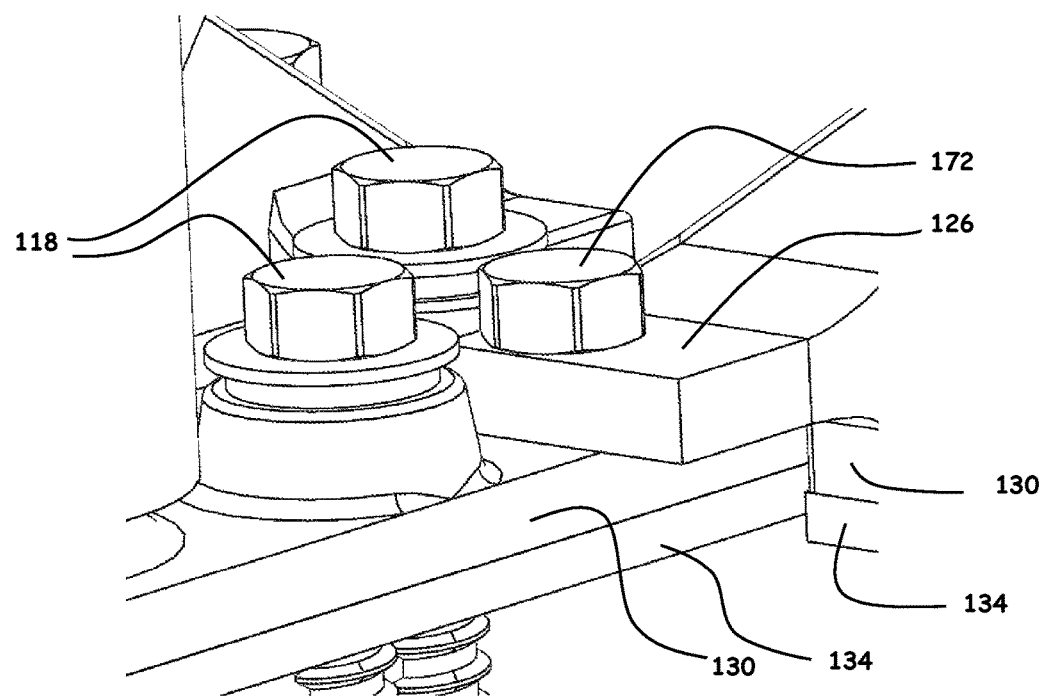
FIG. 22B is an enlarged perspective view of the feet shown in FIG. 22A secured together.
Figure 22C:
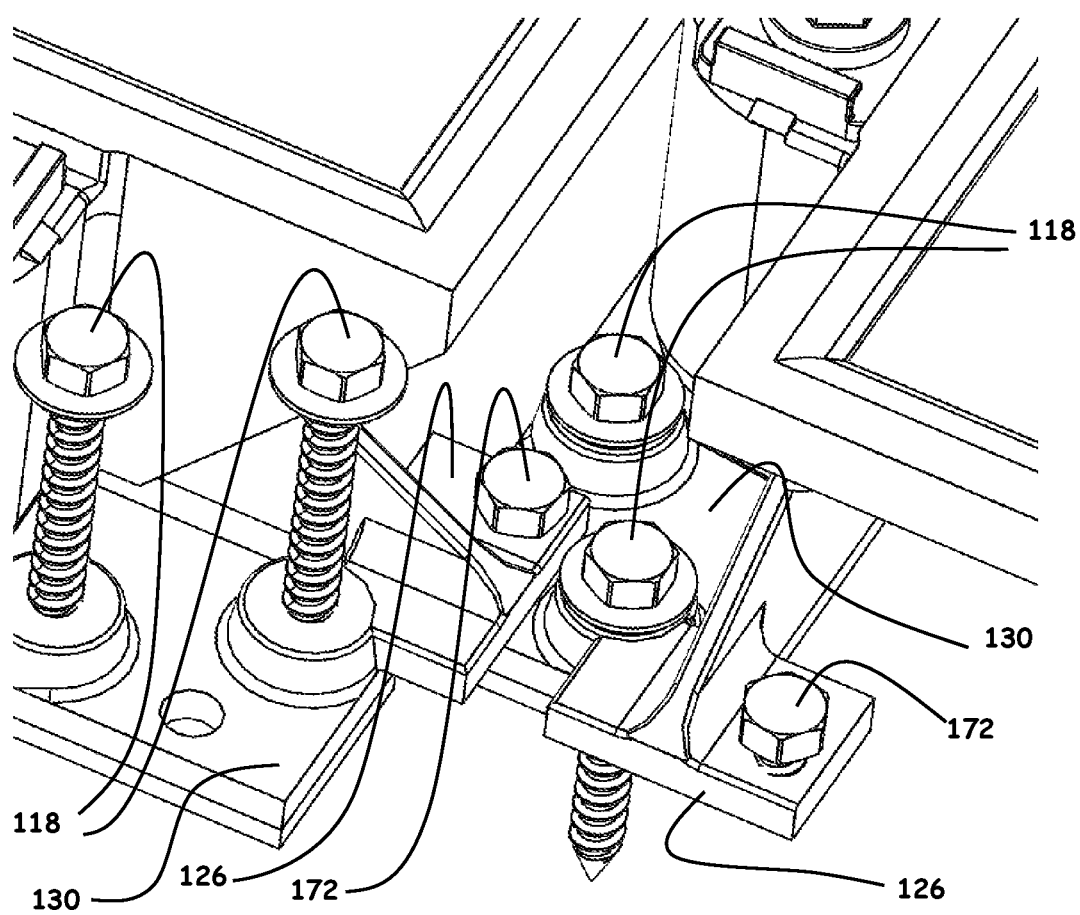
FIG. 22C is an enlarged perspective view of the engaged feet with some fasteners unsecured to the structure surface.

FIGS. 22A-C are enlarged perspective views of feet 102, 104 including another hold down. In particular, the hold down includes fasteners 172 that extend through openings 164 in the base 130 and/or interlock 126. Accordingly, the fasteners 172 allow the feet 102, 104 to be selectively interlock. For example, if some feet 102, 104 are adequately secured without interlocking, the feet 102, 104 may not necessarily be secured using fasteners 172. However, if the feet 102, 104 require additional securement after mounting, the fasteners 172 may be positioned in the openings 164 to secure the feet 102, 104 together.

Embodiments of the methods and systems described achieve superior results compared to prior methods and systems. For example, the systems and methods described simplify the installation of solar modules on structures. More specifically, the embodiments described include preassembled solar modules for direct mounting to a structure. In addition, the embodiments reduce the labor, tools, and materials required for layout of the solar assembly. Also, the solar modules may be installed with greater positional flexibility on the structure surface and more solar modules may be installed on a structure than known solar modules without jeopardizing installation integrity.

In some embodiments, the solar modules include leveling mechanisms to facilitate leveling the solar modules on the structure. Also, in some embodiments, a release mechanism provides for quick release of a portion of the solar modules from the structure.

When introducing elements of the present invention or the embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A preassembled solar module for installation on a structure, the preassembled solar module comprising:
    a laminate for converting solar energy into electricity; and
    a mount releasably connected to the laminate for mounting the preassembled solar module on a surface of the structure, the mount including openings to receive fasteners for securing the mount to the surface of the structure, wherein the preassembled solar module has a pre-mount configuration in which the mount is connected to the laminate as a single unit, wherein the mount is sized to allow the preassembled solar module to be shipped in the pre-mount configuration, and wherein the preassembled solar module does not require disassembly to be mounted to the structure.

2. The preassembled solar module of claim 1 further comprising a release on the mount for disconnecting the mount from the laminate.

3. The preassembled solar module of claim 2 wherein the release comprises a clip removably attached to the mount.

4. The preassembled solar module of claim 3, wherein the clip is free of attachment to the mount and to the laminate.

5. The preassembled solar module of claim 3, wherein the mount further comprises a retainer for retaining the clip on the mount until the clip is acted on by a force.

6. The preassembled solar module of claim 5, wherein the retainer includes a projection that causes the clip to deform when the clip is acted on by a force.

7. The preassembled solar module of claim 6, wherein the clip includes arms, a base, and a tab, the arms and the base forming a U-shape, the tab extending from the base.

8. The preassembled solar module of claim 7, further comprising a leveling fastener extending through the mount, wherein the fastener is received between the arms of the clip when the clip is attached to the mount.

9. The preassembled solar module of claim 2, wherein the mount includes a top and a base, the base releasably connected to the top by the release, the top being connected to the laminate, the base being secured to the surface of the structure by fasteners.

10. The preassembled solar module of claim 1 further comprising a flashing material, wherein the flashing material is aligned with the openings in the mount such that the fasteners extend through the flashing material when the preassembled solar module is mounted to the surface of the structure.

11. The preassembled solar module of claim 1 in combination with a shipping container for shipping the module to a site.

12. A preassembled solar module for mounting on a surface of a structure, the preassembled solar module comprising:
    a laminate;
    a mount for mounting the preassembled solar module on the surface of the structure, the mount connected to the laminate; and
    fasteners for securing the mount to the surface of the structure, wherein the mount has a pre-mount configuration in which the fasteners are retained in openings in the mount and the mount is positionable relative to the surface of the structure, wherein the mount is connected to the laminate in the pre-mount configuration, and wherein the preassembled solar module does not require disassembly to be mounted to the structure.

13. The preassembled solar module of claim 12, wherein each mount includes a receptacle for receiving the laminate, and each mount has a mounted configuration in which the fasteners extend through the mount and the surface of the structure to prevent movement of the mount relative to the surface.

14. The preassembled solar module of claim 12 further comprising a flashing material between the mount and the surface of the structure, wherein the flashing material is aligned with the openings in the mount such that the fasteners extend through the flashing material when the preassembled solar module is mounted to the surface of the structure.

15. A solar module for mounting on a surface of a structure, the solar module comprising:
    a laminate;
    a mount for mounting the solar module on the surface of the structure, the mount connected to the laminate; and
    a leveling mechanism for leveling the laminate when the solar module is mounted on the surface, wherein the leveling mechanism includes a fastener, the fastener being adjustable relative to the mount to adjust the position of the laminate in relation to the mount.

16. The solar module of claim 15, wherein the fastener extends through the mount, the fastener being adjustable relative to the mount to adjust the position of the laminate in relation to the mount, and further comprising flashing material.

17. The solar module of claim 16 further comprising a release on the mount for disconnecting the mount from the laminate, the leveling mechanism configured to maintain position relative to the mount when the mount is disconnected from the laminate.

18. A preassembled solar module comprising:
a laminate; and
a mount connected to the laminate for mounting the preassembled solar module on a surface of a structure, the mount comprising:
a base defining a mounting surface facing the surface of the structure;
a flashing material attached to the base so as to be disposed between the mounting surface and the structure surface; and
a plurality of raised interfaces extending from the base and defining openings for receiving fasteners for securing the mount to the structure surface, the raised interfaces configured to retain the fasteners in the openings prior to the mount being secured to the structure surface, wherein the raised interfaces are positioned such that the fasteners are accessible when the mount is connected to the laminate and the preassembled solar module does not require disassembly to be mounted to the structure.

19. The preassembled solar module of claim 18 further comprising fasteners in the openings.

20. The preassembled solar module of claim 19, wherein the mount further comprises a sealing component on each fastener adjacent each opening.

21. The preassembled solar module of claim 18 wherein the mount is configured to mount the preassembled solar module on the surface of the structure in positions spaced from structural elements of the structure.

22. The preassembled solar module of claim 18 wherein the mount is a discrete structural component and the preassembled solar module is free of a fully enclosing frame.

23. The preassembled solar module of claim 18 wherein the mount is electrically insulative.

24. The preassembled solar module of claim 18 wherein the mount further comprises a sealing material to inhibit water penetrating to the structure.

25. The preassembled solar module of claim 18 wherein the mount further comprises a leveling mechanism.

26. The preassembled solar module of claim 18 wherein the mount further comprises an interlock configured to at least partially secure an adjacent mount to the surface of the structure.

27. The preassembled solar module of claim 18 in combination with a plurality of preassembled solar modules to form a solar array, wherein each of the preassembled solar modules comprises the laminate and the mount, and wherein each mount is configured to interlock with the mount on an adjacent solar module.

28. The preassembled solar module of claim 18, wherein the flashing material is aligned with the openings such that the fasteners extend through the flashing material when the mount is secured to the structure.

29. A solar module for mounting on a surface of a structure, the solar module comprising:
a laminate having a substantially rectangular shape; and
a mount for mounting the solar module on the surface of the structure, the mount connected to the laminate along a perimeter of the laminate, the mount including openings for receiving fasteners to mount the solar module to the surface of the structure, wherein the openings are arranged in an asymmetric pattern in the mount.

30. The solar module of claim 29 wherein the openings are equidistant from a first axis of force and offset about a perpendicular axis from the first axis that is also parallel to an edge of the laminate and gaps in structural elements of the structure such that no more than one opening intersects with the gaps in the structural elements.

31. A solar array comprising:
a first solar module including a first mount for mounting the first solar module on a surface of a structure; and
a second solar module including a second mount for mounting the second solar module on the surface of the structure, wherein the second mount and the first mount interlock to secure the first solar module to the surface of the structure, the second solar module being positioned adjacent the first solar module and offset from the first solar module when the first solar module and the second solar module are mounted to the surface of the structure.

32. The solar array of claim 31, wherein the second mount includes an interlock configured to engage the first mount such that the first mount secures the second mount to the surface of the structure and the second mount secures the first mount to the surface of the structure.

33. The solar array of claim 32 wherein the first solar module has a first edge, the second solar module defining a second edge parallel to the first edge but offset by at least 6 inches.

* * * * *